(12) United States Patent
Shatas et al.

(10) Patent No.: US 6,418,494 B1
(45) Date of Patent: Jul. 9, 2002

(54) SPLIT COMPUTER ARCHITECTURE TO SEPARATE USER AND PROCESSOR WHILE RETAINING ORIGINAL USER INTERFACE

(75) Inventors: Remigius G. Shatas, Huntsville; Robert R. Asprey, Harvest; Christopher L. Thomas; Greg O'Bryant, both of Madison, all of AL (US); Greg Luterman, Lenexa, KS (US); Jeffrey E. Choun, Sunnyvale, CA (US)

(73) Assignee: Cybex Computer Products Corporation, Huntsville, AL (US)

( * ) Notice: Subject to any disclaimer, the term of this patent is extended or adjusted under 35 U.S.C. 154(b) by 0 days.

(21) Appl. No.: 09/430,163

(22) Filed: Oct. 29, 1999

Related U.S. Application Data

(63) Continuation-in-part of application No. 09/430,162, filed on Oct. 29, 1999.
(60) Provisional application No. 60/106,255, filed on Oct. 30, 1998.

(51) Int. Cl.[7] .......................... G06F 13/14; G06F 13/42

(52) U.S. Cl. .......................... 710/126; 710/65; 710/129; 713/400

(58) Field of Search ................................ 370/389, 260, 370/392; 710/38, 123, 126, 128, 129, 104, 52, 65, 22; 713/400; 711/145

(56) References Cited

U.S. PATENT DOCUMENTS 3,925,762 A * 12/1975 Heitlinger et al. ..... 340/870.09
4,764,769 A * 8/1988 Hayworth et al. ............ 342/50
5,235,595 A   8/1993 O'Dowd
5,430,848 A   7/1995 Waggener (List continued on next page.)

FOREIGN PATENT DOCUMENTS

EP      0270896 A2 *  6/1988  ........... G06F/13/12
JP      11184800 A  *  7/1999  ........... G06F/13/36
JP      11184801 A  *  7/1999  ........... G06F/13/36

OTHER PUBLICATIONS

Hsieh et al "Architectural Power Optimization by Bus Splitting", Design, Automation and Test in Europe Conference and Exhibition 2000. Proceedings, pp. 612–616.*
IBM Tech. Disc. Bull. "Procedure and Design to Facilitate", Apr. 1994, vol. 37, Issue 4B, pp. 215–216.*
Schutti et al. "Data Transfer between Asynchronous Clock Domains without Pain", RIIC, SNUG Europe 2000, Rev. 1.1, Feb. 2000, pp. 1–12.*
Hill, T. "Virtex Design Methodology Using Leonardo Spectrum 1999.1", Applications Note, Exemplar Logic Technical Marketing, Apr. 1999, Rev. 3.0, pp. 1–47.*
Duft et al. (ed.) "Xilinx Breaks One Million–Gate Barrier with Delivery of New Virtex Series", Press Kit, Xilinx, Oct. 1998.*
Mobility Electronics, Inc. Brochure for PCI Split Bridge, Scottsdale, AZ, ©1999.
"Digital Semiconductor 21152 PCI–TO–PCI Bridge, Data Sheet", Feb. 1996, Digital Equipment Corporation, Maynard, Mass.
"PCI Local Bus Specification, Revision 2.1", Jun. 1995, The PCI Special Interest Group, Portland, Oregon.

*Primary Examiner*—Thomas Lee
*Assistant Examiner*—Thuan Du
(74) *Attorney, Agent, or Firm*—Nixon & Vanderhye P.C.

(57) ABSTRACT

A network interface is described in which a single computer bus is split over a long distance into two or more intercommunicating buses. On one bus, processing and applications are provided and on the other remote bus, peripheral and local controllers are provided. The buses communicate through a series of: bridge, FPGA, FPGA and bridge. Between the FPGAs, a communication path provides long distance communication.

29 Claims, 16 Drawing Sheets

U.S. PATENT DOCUMENTS

| | | |
|---|---|---|
| 5,659,707 A | 8/1997 | Wang et al. |
| 5,664,223 A | 9/1997 | Bender et al. |
| 5,754,836 A * | 5/1998 | Rehl .......................... 709/400 |
| 5,764,966 A | 6/1998 | Mote, Jr. |
| 5,799,207 A | 8/1998 | Wang et al. |
| 5,812,534 A | 9/1998 | Davis et al. |
| 5,948,092 A * | 9/1999 | Crump et al. ................ 710/129 |
| 6,012,101 A | 1/2000 | Heller et al. ................. 709/250 |
| 6,016,316 A | 1/2000 | Moura et al. |
| 6,146,158 A * | 11/2000 | Peratoner et al. ........... 439/110 |
| 6,202,116 B1 * | 3/2001 | Hewitt ........................ 710/129 |
| 6,240,481 B1 * | 5/2001 | Suzuki ........................ 710/129 |

\* cited by examiner

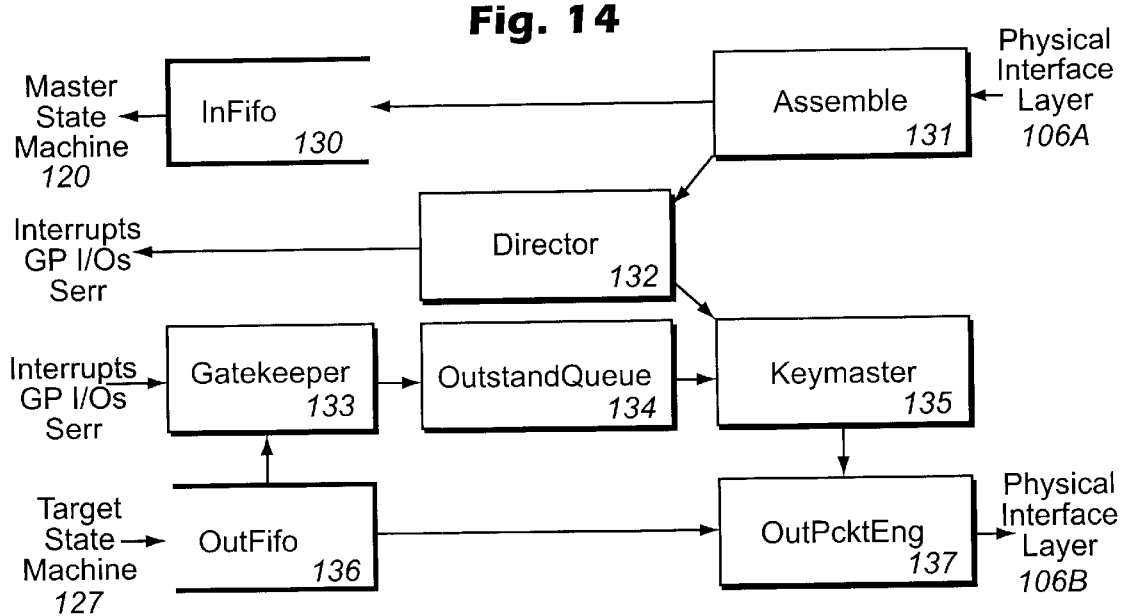
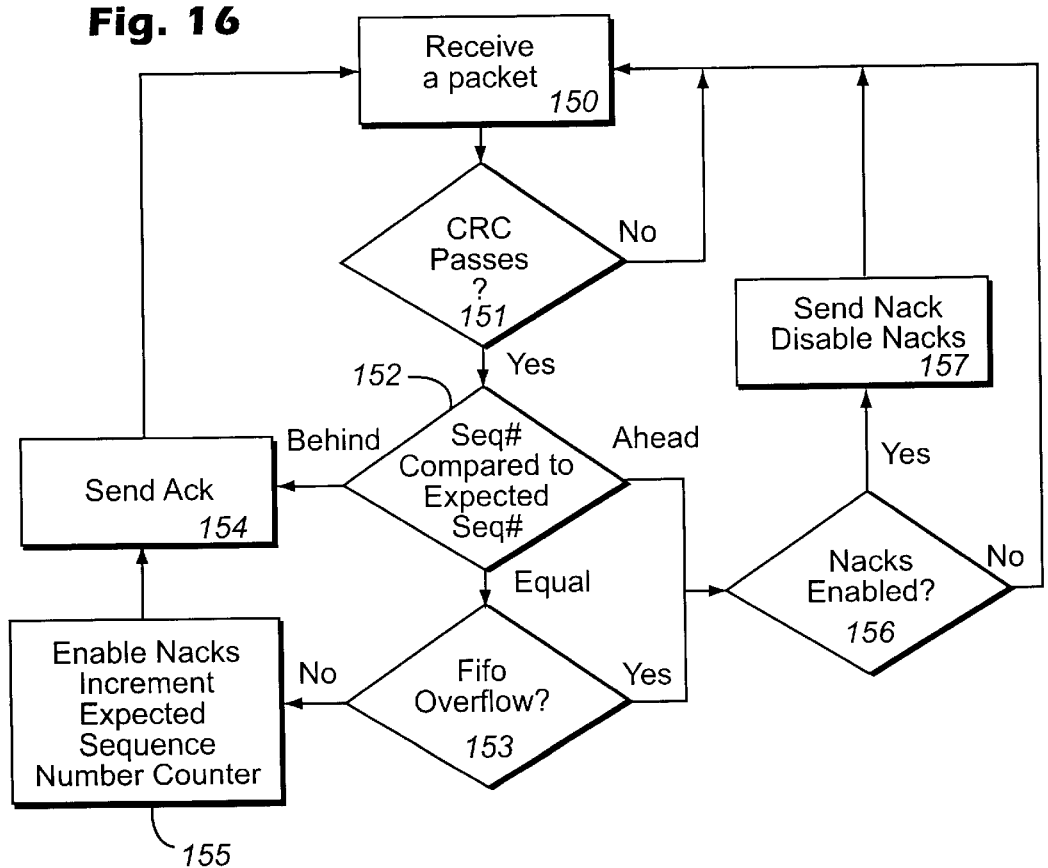

SPLIT COMPUTER ARCHITECTURE TO SEPARATE USER AND PROCESSOR WHILE RETAINING ORIGINAL USER INTERFACE

BACKGROUND CROSS REFERENCE TO RELATED CASES

This is a continuation-in-part of U.S. application Ser. No. 09/430,162, filed Oct. 29, 1999, still pending, which is a continuation of Provisional Application No. 60/106,255 filed Oct. 30, 1998, the entire disclosure of which is incorporated herein by reference.

FIELD OF THE INVENTION

This invention relates to computer networking systems.

BACKGROUND AND SUMMARY OF THE INVENTION

U.S. application Ser. No. 09/430,162 describes a computer paradigm providing remarkable advantages in computer networking. In particular, the so-called split computer separates the CPU and applications programs from a computer's local controllers and peripherals, such that the CPU and applications may be stored and maintained at a central facility convenient to a facilities manager, while local controllers can remain at the desktop with the associated user peripherals. The specific advantages and general aspects of this new paradigm is described in more detail in the above described U.S. application which is incorporated herein by reference and for sake of brevity will not be repeated herein.

FIG. 24 illustrates an example embodiment of the so-called split computer. As shown in FIG. 24, the remote target room 185 contains a number of targets having CPUs, hard drives, etc. One target 186 is shown connected to a work station 188 via twisted pair 187. The target 186 is also referred to as the host side 186 and the work station 188 is also referred to as the remote side 188. On the host side 186, the CPU 189 communicates on a host bus 190. The host bus 190 can be a standard PCI bus within a CPU motherboard, or can be any other type of computer data bus. On the remote side 188, a remote bus 193 communicates with various local controllers 194 which will be described in greater detail following. Among other functions, the local controllers 194 support various peripherals 195 located at the work station 188. As one can see from FIG. 24, in effect, the bus that would ordinarily carry communications from CPU 189 to controllers 194 has been "split" into buses 190 and 193 communicating with each other via interfacing 191 and 192 and twisted pair (or other communications line/media) 187.

The practical result of the split computer is that the host bus 190 and remote bus 193 must be interfaced such that the CPU 189 can engage in normal communications with the local controllers 194. Ideally, the host bus 190 and remote bus 193 will be capable of communications along a large range of distances including a few feet, as far as one corner of a building to another, and even greater distances if necessary. The present invention is not limited to any particular kind of communication line type such as wire line, fiber optic, air wave, etc., but it would be particularly advantageous if the present invention allowed the host bus 190 to communicate with the remote bus 193 over long distances via commonly available twisted pair 187. For this purpose, special interfacing 191 and 192 must be provided between the host bus 190 and remote bus 193 at the host side 186 and remote side 188.

Some schemes already exist for communication along a computer bus and between plural computer buses. Examples of these prior art interfaces are shown and described with respect to FIGS. 1–3. Thus, as shown in FIG. 2, a PCI type bus 12 may include a number of components communicating along the bus 12 in accordance with the standard PCI local bus specifications. The PCI local bus specifications are standards by which computer communications can occur within internal buses of a PC-based computer. The PCI local bus specification rev. 2.1, dated Jun. 1, 1995, is an example prior art PCI bus specification and is incorporated herein by reference. In FIG. 2, the PCI bus 12 provides communication between a master 14 and one or more targets 15A–15B. Communications occur when the master 14 provides information addressed to a particular targets 15A–15B and places that communication on the PCI bus 12. Such communications along PCI buses 12 are not uncommon.

The timing of communications between a master 14 and targets 15A–15B is traditionally specified in the bus specification. Thus, the PCI bus specification or PCI bus 12 provides hard limits on how much time can elapse before a command issued by master 14 "times out" without receiving response. In other words, master 14 may send a command to targets 15A–15B on PCI bus 12 with an address for target 15A to perform a particular operation. The target 15A must receive the command and respond to the command within a certain time set by the PCI standard before the master 14 will time out on the issued command.

Thus, as shown in FIG. 2, master 14 issues a command at clock $C_0$ to target 15B. Target 15B will operate on the command and return a response (or acknowledgment) to master 14, which will be received by master 14 no later than $C_0+X$ where X is a number of clocks dictated by the bus standard. If $C_0+X$ exceeds the PCI standard for response time to a command, master 14 will time out on the command before it receives its response from target 15B. This situation is rarely, if ever, a design constant for a typical PCI system but it does limit the physical size of a PCI bus and has application to the present invention, as will be described.

The time out aspects of bus communications pose a problem in the split computer paradigm. Referring again to FIG. 24, assuming CPU 189 to be a client speaking on host bus 190, the CPU 189 will be sending commands to local controller 194 via the path (in order): host bus 190, interface 191, twisted pair 198, interface 192, and remote bus 193. Unfortunately, this distance of travel precludes the local controller 194 from operating on the command and responding to the CPU 189 in time before the CPU 189 times out on the command. In other words, the standard bus time out restrictions are too small for transmission response to occur from CPU 189 to local controllers 194 and back to CPU 189 before the time out occurs.

FIG. 1 illustrates a prior art arrangement which addresses communication between plural PCI buses 12 and 13. In the embodiment of FIG. 1, bridge 10 allows an increased number of masters/targets on a PCI system by connecting a first bus with a second bus to provide a second set of loads. The bridge 10 is a known device and may be, for example, a Digital Semiconductor PCI-to-PCI bridge. An example of such a bridge is the Digital Semiconductor 21152 bridge, described in Digital Semiconductor's February 1996 data sheet, which is incorporated herein by reference.

As shown in FIG. 3, the bridge 10 assists the clients 14/16 and targets 15A–B/17A–B to communicate with each other over the PCI buses 12 and 13. Thus, a master 14 communicates differently to targets 15A–B than it would to targets 17A–B. In the former case, if master 14 desires to read a memory location of target 15A, master 14 simply sends an address to target 15A on PCI bus 12 and target 15A acknowledges the request to master 14 on the PCI bus 12, before the time out condition occurs (and can then return the data). In the latter case, however, the target 17A cannot receive and return the information requested before master 14 will time out. Thus, the master 14 sends its read request to bridge 10 on PCI bus 12. The bridge returns an instruction to master 14 instructing the master 14 in essence "sorry, try again later." Meanwhile, however, bridge 10 sends the read request to the target 17A on PCI bus 13. As the master 14 continues asking the bridge 10 for the read request and the bridge 10 continues to tell the master 14 "try again," the target 17A is retrieving the requested data from its memory. Once the target 17A has retrieved the requested data, it puts it on PCI bus 13 to bridge 10. In the next instance in which master 14 sends the read request to bridge 10, the bridge 10 responds within the time out period with the requested information previously sent to it by the target 17A.

The prior art arrangement of FIG. 3 cannot be simply substituted into the split computer environment, however, since there are still time and distance restrictions on the bridge 10. The distance between the master 14 and bridge 10 cannot be so long that the client will time out on its command before it receives the "not yet" response from the bridge 10. Thus, the distance between master M and bridge 10 (FIG. 1) is limited by the bus standards and by normal propagation delays, as is the distance between bridge 10 and target S.

Thus, the solution to the split computer distance communications of FIG. 24 is not so simple as replacing the interfacing 191 and 192 with bridge 10 since that substitution will not yield satisfactory distances between the remote target room 185 (i.e., host side 186) and the work station 188. The present invention increases the distance between host side 186 and remote side 188 by essentially taking time out of the PCI transmission factors. In other words, with the present invention, instead of a client timing out while data travels, the only significant time constraint in getting data from a target to a master (after a master commands the target) is the number of times a master will ask the target for data before it stops requesting. With the present invention, time out conditions should not occur as a result of responses to a command arriving too late.

In accordance with an example embodiment of the present invention, communications received from a bridge (as non-packet data) are packetized and communicated between field programmable gate arrays and delivered to a second bridge for communication onto a remote PCI bus (again as un-packeted data).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 14 is a functional block diagram of the data link layers in accordance with an example embodiment of the present invention;

FIG. 16 is a logic diagram of AckNack generation;

DETAILED DESCRIPTION OF THE PRESENTLY PREFERRED EMBODIMENT

The present invention provides appropriate interfacing circuits 191 and 192 (FIG. 24) such that host buses 190 and 193 may transparently communicate via standard protocols over long distances and over convenient communication media such as twisted pair 187. With the appropriate interfacing 191 and 192, the advantages of the split computer paradigm described in U.S. application Ser. No. 09/430,162, filed contemporaneously herewith, can be realized to great potential.

Figure 4:
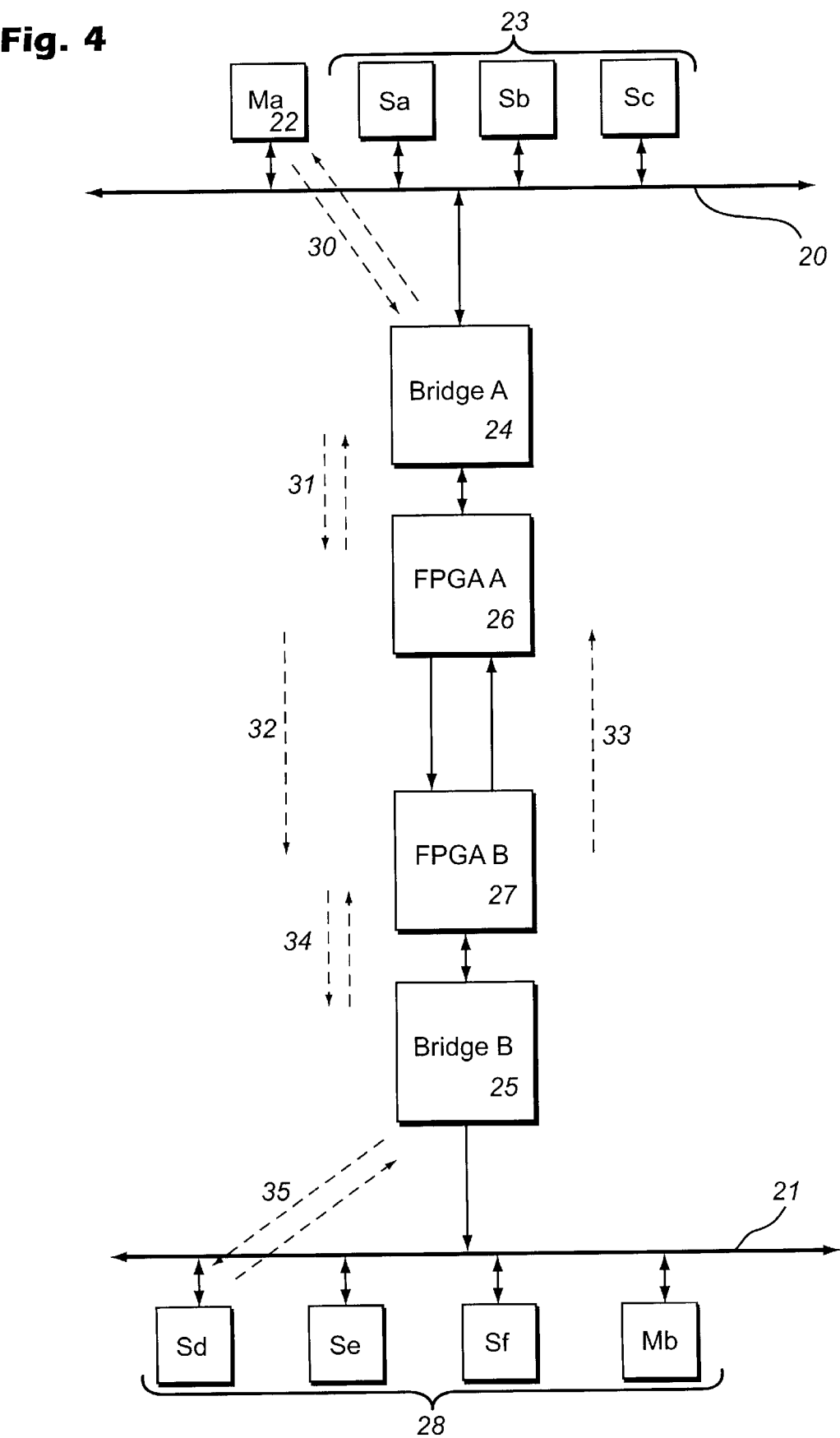
FIGS. 4 and 5 are example embodiments of the present invention illustrating different types of communications between respective buses.
Figure 24:
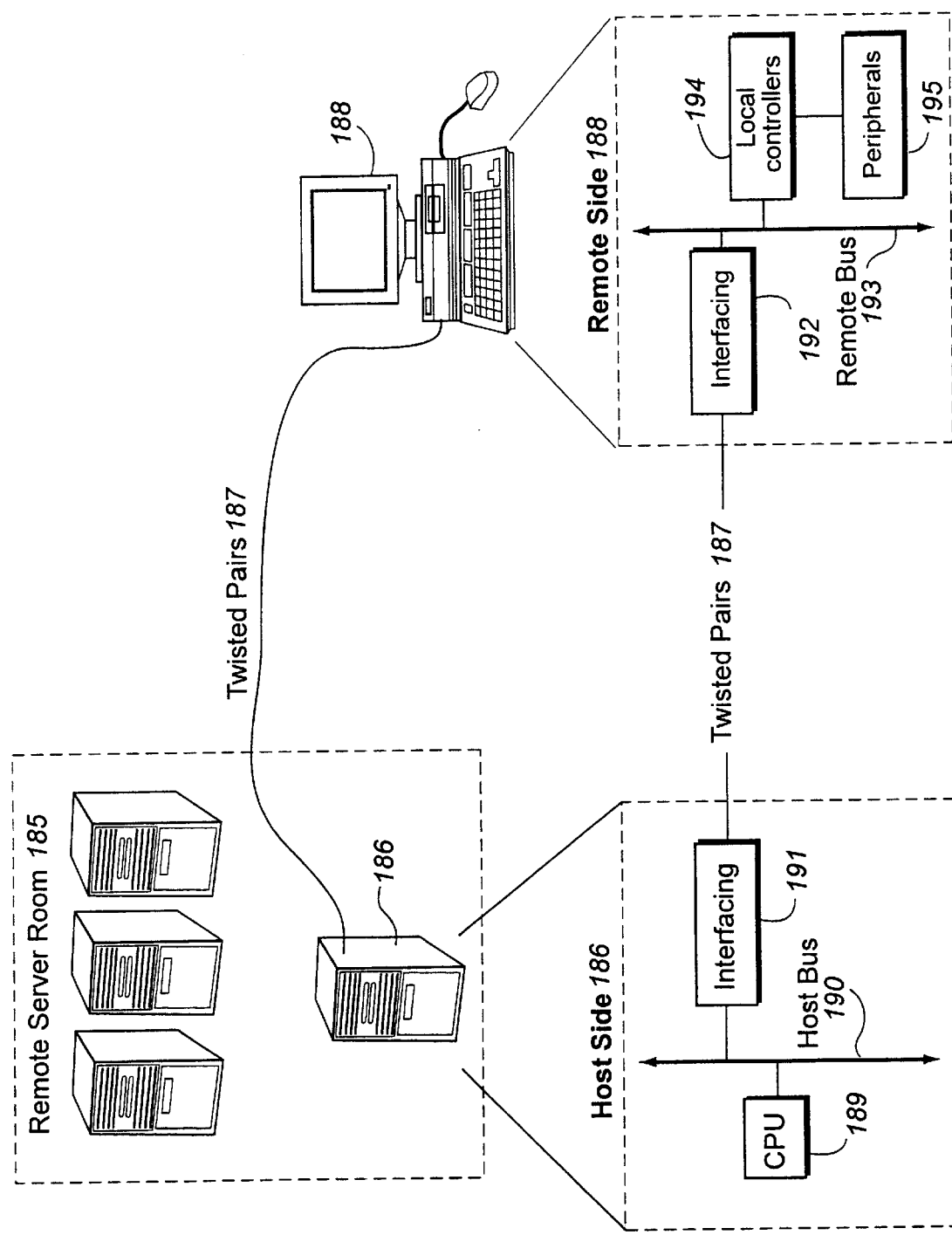
FIG. 24 is an example embodiment of the split computer in accordance with the present invention.

FIG. 4 illustrates in block diagram format an example embodiment of such interfacing circuitry. In FIG. 4, a client 22 and targets 23 communicate via a common host PCI bus 20. At what can be a very remote location from the host PCI bus 21, targets 28 communicate via another, separate terminal PCI data bus 21. In accordance with this embodiment, a first bridge 24 communicates with the host bus 20 and provides a bidirectional communication to a field programmable gate array (FPGA) 26 (or alternatively ASIC). The FPGA 26 communicates with another field programmable gate array 27 via a communication link, such as twisted pair 187 (FIG. 24). FPGA 27 communicates via a bi-directional link to a second bridge 25, which communicates via a bi-directional link to the terminal PCI bus 21.

As described above, when the client 22 desires to communicate with a target 23 on the common host PCI bus 20, it can do so in accordance with prior art, known PCI protocols. If, however, the client 22 needs to communicate with a master/target 28 on the terminal PCI bus 21, its ability to do so becomes time restricted, as described in detail above. The operation of the present invention to accommodate the communications between a device on the host PCI bus 20 with a device on the remote terminal PCI bus 21 differs depending on the type of command issued by the originating device.

Figure 5:
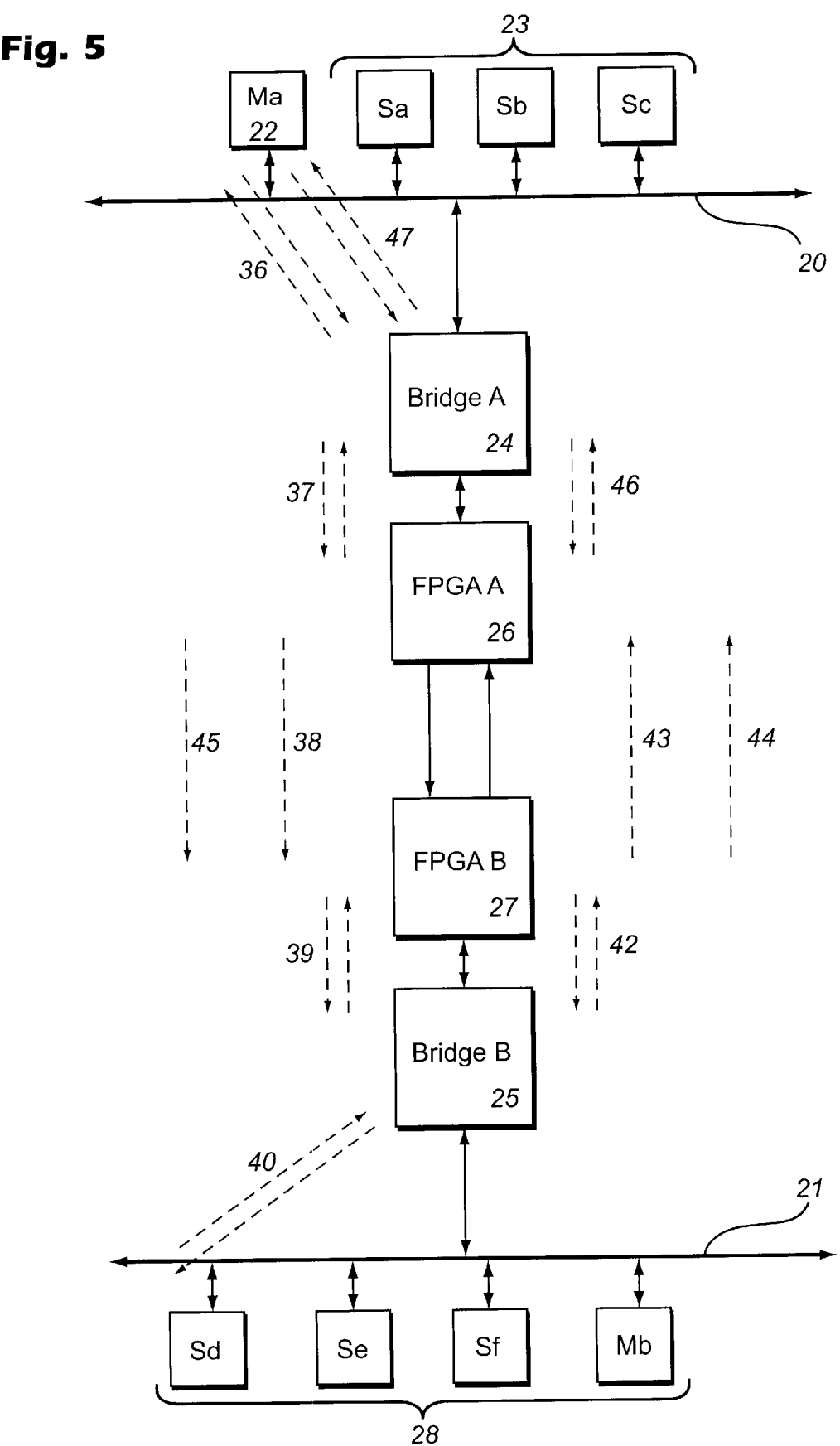

Specifically, the preferred embodiment of the present invention is described with respect to a so-called "one action" communication (FIG. 4) and a "two action" communication (FIG. 5). In a one action transaction, the entire transaction is completed upon the issuance of the request (for example, from the client 22). In a two action transaction, the transaction is not completed until both the request action is completed and a response action is completed. In other words, one action transactions require no return data or status; they're considered completed when the request action is generated and accepted. An example of a one action transaction is a so-called posted write action in which a device writes data into a memory of another device without requiring any response action. It should be noted that the only current PCI-standard one action transaction is the posted write command, however, the present invention is anticipated for use not only in communicating PCI transactions but in also communicating non-PCI transactions. Thus, one could expect that several different types of commands can be envisioned within the one-action transactions routine discussed with respect to FIG. 4 below.

Referring now to FIG. 4, the one-action example embodiment will be described with respect to a posted write function in which the client 22 intends to write to the memory of target $S_d$. First, client 22, at communication 30, issues the write command, together with the data to be written, onto host bus 20 addressed to bridge 24. The bridge 24 immediately acknowledges the posted write command in the communications set 30, whereupon the client 22 considers the transaction ended. Bridge 24 then communicates the posted write command, at communications set 31, to FPGA 26 via the same data standard (for example PCI standard) as was used on bus 20. The FPGA 26, in the communication set 31, acknowledges receipt of the posted write from bridge 24.

The FPGA 26 then packets the information for long distance communication over the twisted pair 187 and communicates the posted write command at communication 32 to FPGA 27. It should be noted that one of the operations performed by the FPGA 26 is to convert data received in interactive format via communication set 31 into a packet format for transmission to FPGA 27 at communication 32. That is, the PCI standard, for example, is not a packet transmission, but is interactive and does not follow a given data format. On the other hand, the communication between FPGAs 26 and 27 is a packet transmission, conducive to long distance communication. In other words, the operation of FPGA 26 is analogous to the operations performed by a crosspoint-switch based telephone system upon the information in a telephone call (non-packet, interactive).

Once FPGA 27 receives the packeted posted write command at communication 32, it acknowledges receipt of the command at communication 33, converts the posted write back into the original format (consistent with communication 31), and sends the data to bridge 25 at communication set 34. Thus, at communication 34, the data has been reconverted back into the format which is common to the buses 20 and 21, for example, the PCI interactive data format. Bridge 25 receives the posted write command at communication set 34, acknowledges it to the FPGA 27, and sends it on to bus 21 at communication set 35. Once on the bus 21, target $S_d$ recognizes the command as addressed to itself, retrieves the command at communication set 35, and acknowledges the command to bridge 25. Having received the posted write command information and the data to be written, the target $S_d$ simply writes the data received into its memory and ends the transaction.

As one can see from FIG. 4, the one-action transaction scenario is a relatively simple application of the present invention in which PCI data is packeted and formatted for long distance transmission by FPGAs 26 and 27. As far as the system is concerned, everything between bridge 24 and bridge 25, as far as the system is concerned, acts and appears to be simply a PCI data bus, just like buses 20 and 21. In reality, however, the FPGAs 26 and 27 are emulating PCI buses to the respective bridges 24 and 25, but therebetween are performing data conversion and timing functions that are invisible to the rest of the PCI circuitry.

FIG. 5 illustrates an example embodiment of the so-called two-action transaction. The structure of FIG. 5 is identical to that of FIG. 4, but the communications sets between the various components will be different, as described below. The example embodiment of FIG. 5 will be described with respect to a "read" operation in which client 22 requests data from the memory of target $S_d$. First, at communication 36, client 22 issues the read command onto host PCI bus 20 identifying target $S_d$ and the address location for the read operation. As described earlier, if the master 22 were to request the read operation from one of the targets 23 on the common bus 20, the target 23 would need to respond to the client 22 within a predetermined time before the client 22 timed out on the read command. To accommodate this, the bridge 24 responds in the communications set 36 to the client 22 essentially asking the client 22 to "retry" the read command again later. Thus, during the course of the communications set 36–47 described below, the client 22, in bridge 24 will be continuously exchanging "read" commands and "sorry, retry" responses.

In the meantime, at communications set 37, bridge 24 communicates the read command to the FPGA 26. Because this side of the FPGA 26 is intended to emulate a PCI bus, the FPGA 26 responds to the bridge 24 in the communications set 37 with the same kind of response that bridge 24 is giving client 22, namely "sorry, retry." Then, FPGA 26 packets the information into communication 38 and sends it to FPGA 27 on twisted pair 187 via the uni-directional communication link. At communication 43, the FPGA 27 acknowledges receipt of the communication 38 to the FPGA 26. Of course, as the FPGA 26 is packeting and delivering the communication 38 to the FPGA 27 and receiving the acknowledgment 43, it continues to tell bridge 24 that the continuously generated read commands have to be "retried later."

Once the FPGA 27 receives the data 38 from the transmission line 187, it converts it back to the PCI standard. Thus, FPGA 27, at communications set 39, informs bridge 25 that a read request destined for target $S_d$ at a particular memory location needs to be delivered to target $S_d$. Bridge 25, in communication set 39, informs FPGA 27 that it must retry the request later and in the meantime provides the request to target $S_d$ via communications set 40. Server $S_d$ provides the requested data from the requested memory location at communications set 40. Since bridge 25 and target $S_d$ are on the common PCI bus 21, the communication between bridge 25 and target $S_d$ must follow the standard PCI protocol in which the response from target $S_d$ occurs before the bridge 25 times out on its read request.

From the above description, one can see that each component in the stream of communications need not be fully cognizant of all operations downstream. In essence, client 22, bridge 24, and bridge 25, all function as though they are communicating directly with target $S_d$, when in fact only bridge 25 is doing so. Further, as between bridge 24 and bridge 25, they can be standard bridges which believe that they are speaking to each other via a common PCI bus, when in fact the FPGAs 26 and 27 are merely emulating a bus to the bridges 24 and 25 while providing long distance communication processing therebetween. Thus, FPGA 26, twisted pair 63 and FPGA 27 together form a mock PCI bus to the remainder of the FIG. 5 system.

The return path of the two action transactions of FIG. 5 will now be described. Recall that target $S_d$ has read the requested memory address and provided the requested data to the bridge 25. While that was occurring, bridge 25 was instructing FPGA 27 via communications set 39 that its read requests could not be performed and should be retried. After bridge 25 has received the requested data from target $S_d$, on the next request from FPGA 27, bridge 25 responds with the requested data (that had been previously received from target $S_d$). Thus, at communications set 42, FPGA 27 requests the data and bridge 25 provides the requested data to FPGA 27 via the PCI standard. FPGA 27 then converts the data into packet format and communicates the packets at communication 44 to FPGA 26 the next time FPGA 26 requests the data at communication 45. FPGA 26 then re-converts the packeted information back to the PCI format and, in response to the next-received read request command from bridge 24 to FPGA 26, the FPGA 26, at communication set 46, responds with the requested data. Similarly, once the bridge 24 has received the requested data, it provides the data to client 22 at communication set 47 just after the client 22 provides the next request for the information.

In essence, the components between the client 22 and the target $S_d$, in the above example embodiment, provide a stream of components for the data flow, in which each predecessor component in a request action transaction is put on hold by instructing the predecessor to "retry later" the same request action while the successor component in reality has passed the request along the line. The "retries" continue on until the data is received back up the line and, in the next subsequent "retry," the requested data is delivered.

Figure 6:
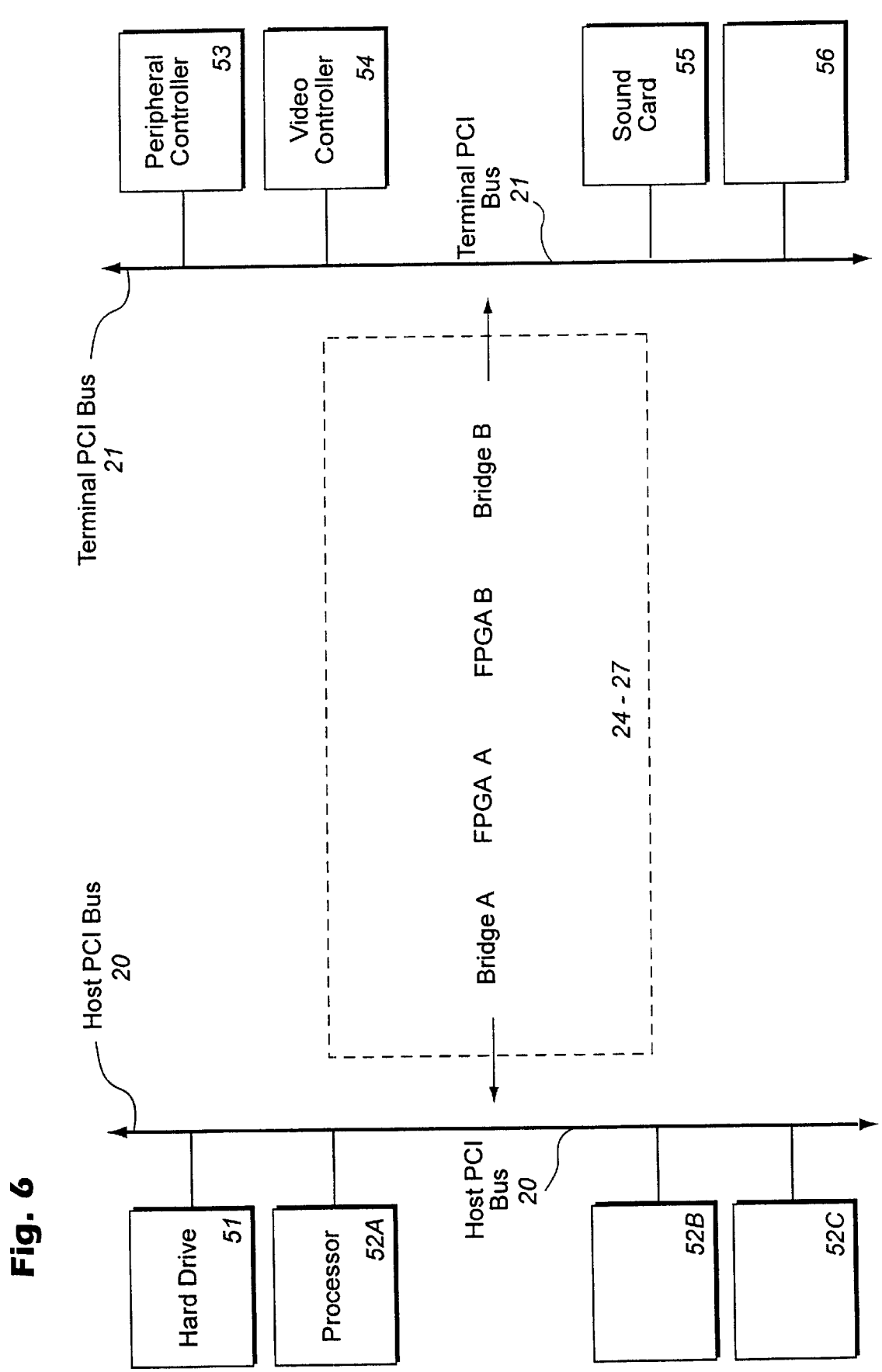
FIG. 6 is an example application of the embodiments of FIGS. 4 and 5 into the split computer arena.

FIGS. 4 and 5 illustrate the example embodiment of the present invention in the context of generic "client" and "target" devices on two remote PCI buses 20 and 21. FIG. 6 extends the generic application of the above invention to the split computer environment of, for example, FIG. 24. In FIG. 24, the host side 186 includes the processor and application software communicating on the host bus 190, while the remote side 188 includes the local controllers 194 and peripherals 195, etc. communicating on the remote bus 193. In FIG. 6, the host PCI bus 20 is analogous to the host bus 190 in FIG. 24 and the terminal PCI bus 21 is analogous to the remote bus 193. Thus, on the host side of FIG. 6, the processor 52A will provide processing power and the hard drive 51 will provide applications software, both communicating on the host PCI bus 20. Further devices 52B and 52C will of course be included on the host side 186 of the split computer as well. On the terminal side of the split computer, terminal bus 21 provides communication to peripheral controller 53, video controller 54, sound card 55, and other local devices 56. The breakdown of processor/applications components that will communicate on host bus 20 versus local controllers that will communicate on terminal bus 21 are discernible from U.S. application Ser. No. 09/430,162, described above.

As shown in FIG. 6, the devices on host bus 20 communicate with the other half of its split computer on terminal bus 21 via the same type of component arrangement described previously with respect to FIGS. 4 and 5. Specifically, between host bus 20 and terminal bus 21 are bridge 24, FPGA 26, FPGA 27, and bridge 25, as shown in FIG. 6. The communications protocol between the host bus 20 and terminal bus 21 can be in accordance with that described with respect to FIG. 4 and FIG. 5 in both the one-action and two-action scenarios. Thus, for example, processor 52A can provide a write action to sound card 55 in accordance with the one action transaction described above with respect to FIG. 4. Further, processor 52A can provide a read action from video controller 54, via the two action transaction example described above with respect to FIG. 5.

Figure 7:
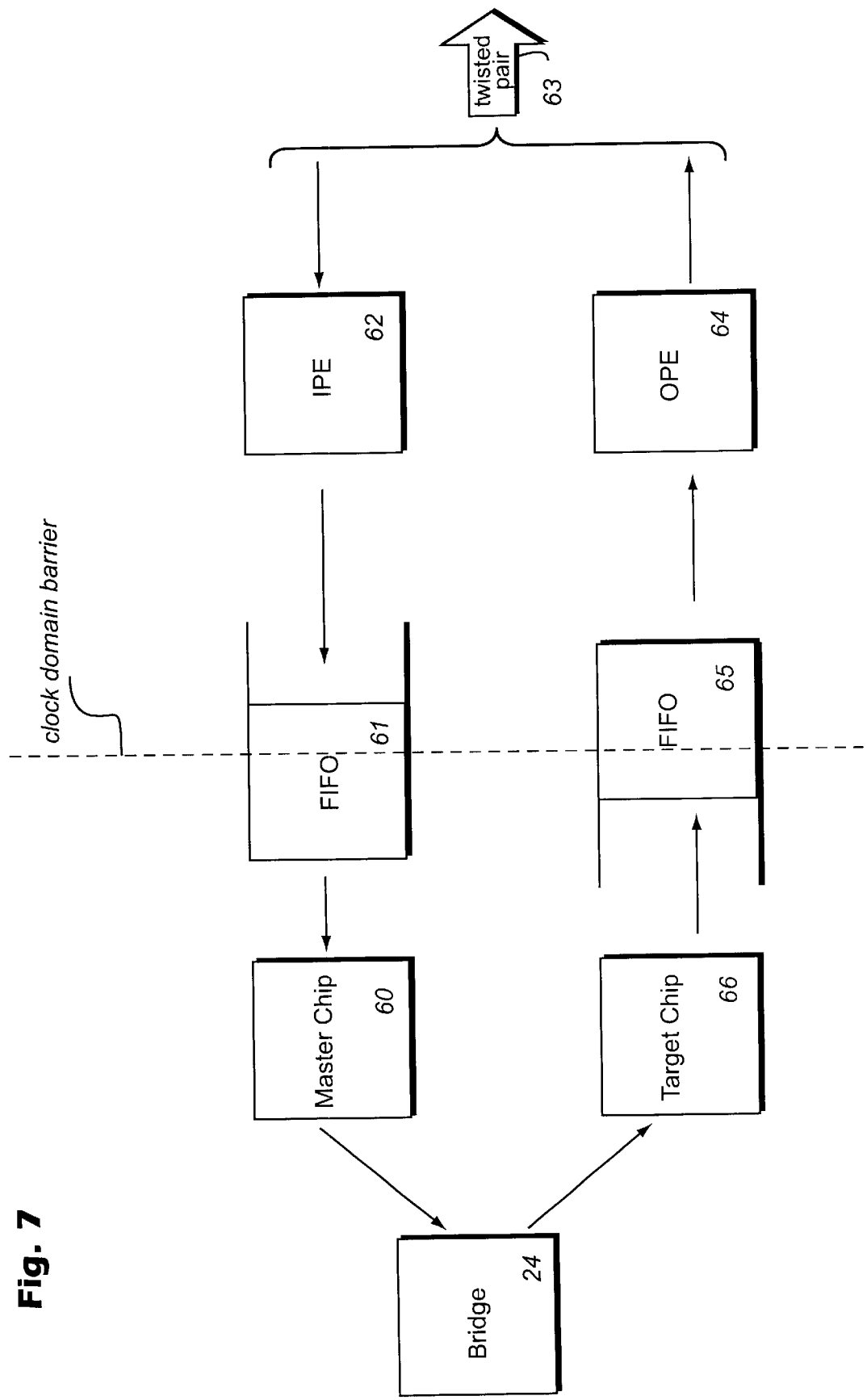
FIG. 7 is an example embodiment of the bridge and FPGA block diagrams associated with either a host or terminal side of the split computer.

FIG. 7 illustrates further detail of an example embodiment of the present invention. In FIG. 7, the bridge 24 (reference FIGS. 4 and 5) is shown communicating with six components contained within the FPGA 26. In particular, the bridge 24 outputs commands/responses with elements 64–66 for delivery onto twisted pairs 63 and receives commands/responses from elements 60–62 from the twisted pair. Thus, when bridge 24 is the recipient of a action/response, the action/response comes from twisted pairs 63 to the incoming packet engine 62 through FIFO 61, into master chip 60, into the bridge 24. Similarly, when actions/requests are being sent from the bridge 24 onto the twisted pairs 63, they proceed to target chip 66, and to FIFO 65, into outgoing packet engine 64, and onto twisted pairs 63.

In FIG. 7, the term "target" refers to the elements which act as the target of a transaction. So, for example, if a bridge is sending a write command, the bridge puts the write address on the PCI bus and the target 66 will accept address and data and provide appropriate handshaking to the bridge to accept the transaction. Once the target chip 66 receives the transaction, it delivers it to FIFO 65 which provides buffering of multiple transactions that have been accepted by the target 66. This buffering serves several functions. First, since the PCI bus between bridge 24 and target chip 66 is non-packeted, interactive data flow (similar to a voice conversation on 1920s-vintage telephone equipment), the target chip 66 can be accepting actions/responses from bridge 24 at a different rate and protocol than will be delivered onto the twisted pairs 63 in packet format. Secondly, the FIFO 65 provides the opportunity to change clock domains. In other words, with the embodiment of FIG. 7, the element of time and the rate of transaction has essentially been taken out of the PCI transmission equation because the present might change to packet form and because the FPGAs provide the continuous "try-again" feature.

Figure 1:
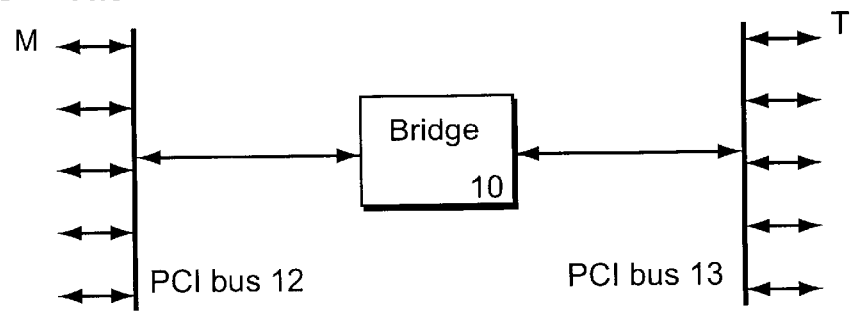
FIGS. 1–3 or art example embodiments of PCI standard bus communications protocols.
Figure 2:
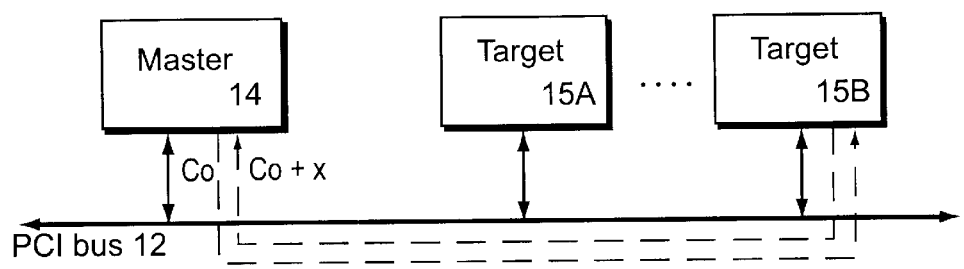
Figure 3:
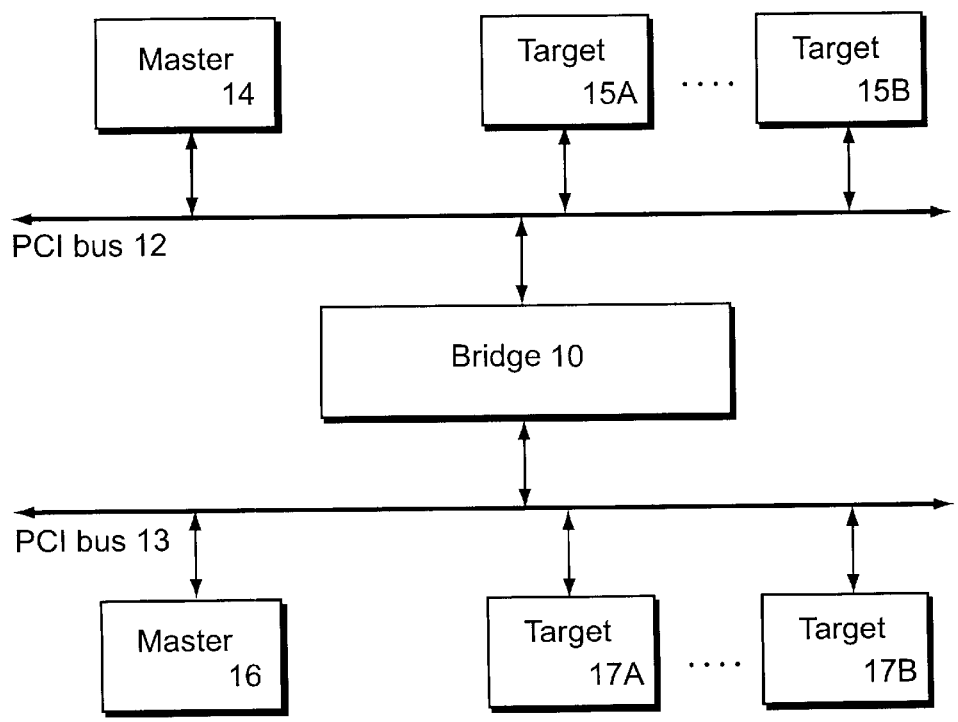

Instead of the bridge 24 timing out while data travels, the target chip 66 is occupying bridge 24 with "retries" while the FIFO 65 changes the clock domain entirely. The change in clock domain shown in FIG. 7 has an additional added benefit. Whereas in a bridge prior art system such as shown in FIG. 3, the PCI bus 12 and PCI bus 13 operate at a common clock rate (i.e., bridge 10 pulls its clock off of PCI bus 12 and delivers commands to PCI bus 13 at the PCI bus 12 clock rate), the present invention can bridge buses of completely different clock rates.

In the embodiment of FIG. 7, for example, there is nothing that stops the FPGAs 26 and 27 (FIGS. 4 and 5) from running at different clock rates such that the connection between FPGAs 26 and 27 ig a clock break between buses 20 and 21. This occurs in part because FIFOs 61 and 65 (FIG. 7) allow the clock domain to be changed by buffering data to be packeted/de-packeted. Thus, with the present invention, disparate PCI bus rates can nevertheless communicate with each other.

It should be noted that although FIG. 7 implies that certain of the components 24 and 60–66 may be Very Large Scale Integrated Circuit (VLSI) chips, any or all of the components shown in FIG. 7 could be combined into a single chip or two or more chips.

Once the FIFO 65 has buffered the data, the outgoing packet engine 64 converts the data into packets defined by a protocol designed for transmission onto twisted pairs 63. Additional functional blocks are included in the OPE 64 and will be described later with respect to FIG. 14.

Figure 8:
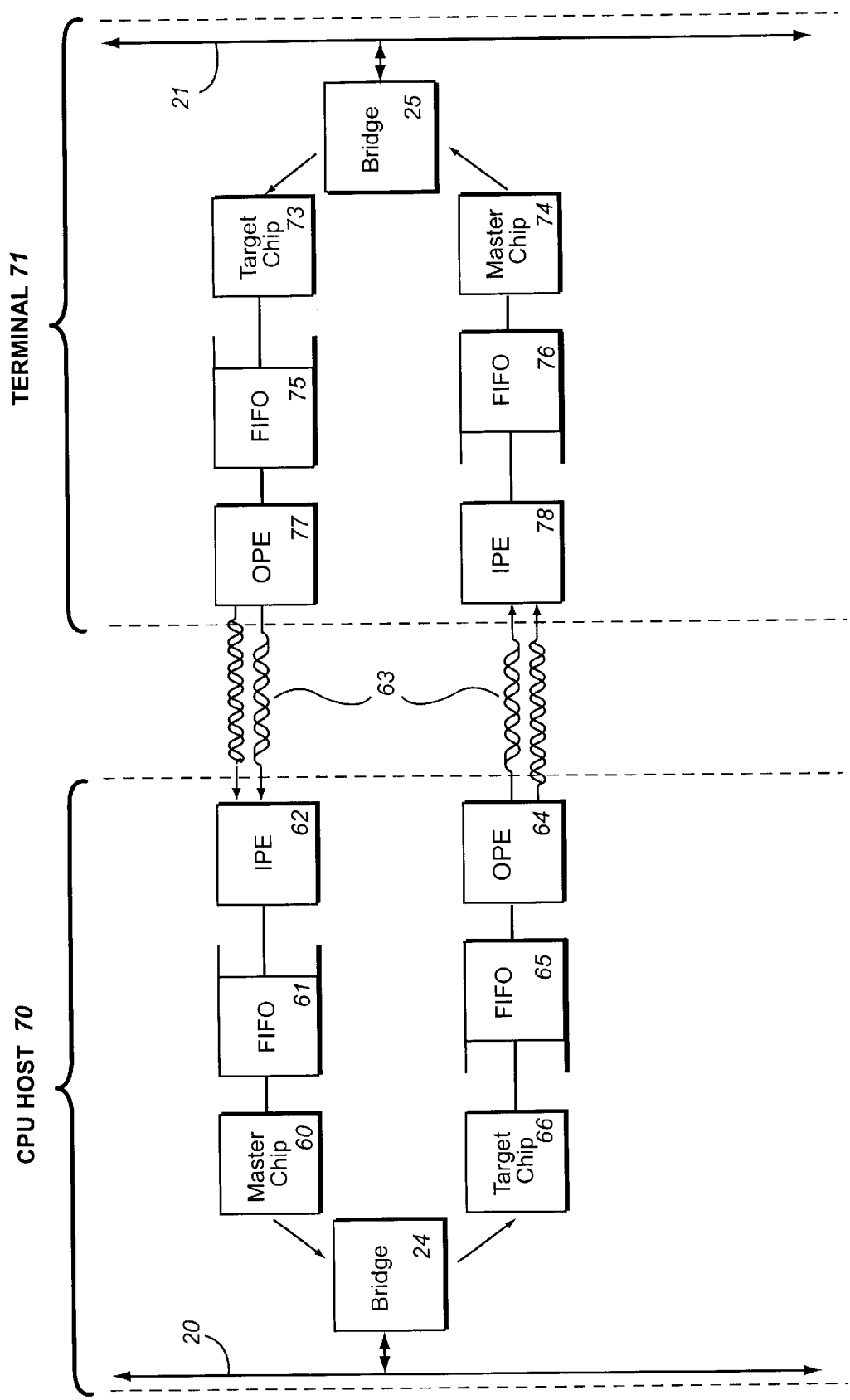
FIG. 8 is an extension of FIG. 7 illustrating both the host and terminal sides with associated block diagram representations of the circuitry.

FIG. 8 is an extension of FIG. 7 in that it discloses the components of FIG. 7 for both the host and terminal sides of the preferred embodiment. In particular, host side 70 includes the host PCI bus 20 together with the components shown in FIG. 7. On the terminal side 71, terminal PCI bus 21 communicates with a mirror image set of components. Specifically, terminal PCI bus 21 includes a PCI link to bridge 25, which includes a PCI link to target chip 73 and master chip 74. Target chip 73 communicates with FIFO 75, which communicates with outgoing packet engine 77. On the receive side, master chip 74 provides action/requests to bridge 25 and receives them from FIFO 76. FIFO 76 communicates with incoming packet engine 78. The packet engines 62, 64, 77, and 78 communicate over twisted pair communication lines 63.

It should be noted that FIFOs 61, 65, 75 and 76 do not act as traditional FIFOs, but are modified as follows. Using FIFO 65 as an example, traditionally, bridge 24 would provide a posted write to target chip 66, which provides the posted write to FIFO 65. Once the FIFO 65 sent the data out, traditionally it would eliminate it. But, the present FIFO is not traditional. Instead, it takes into account the possibility that transmission may not accurately occur, For example, once FIFO 65 sends the data to OPE 64, which transmits it to IPE 78, noise on the transmission line 63 may have so severely degraded the transmission that IPE 78 does not receive it. In another example, IPE 78 may receive the data from OPE 64 via line 63 but may be unable to deliver it to FIFO 76 because the FIFO 76 is fill. Recalling that bridge 24 presumes that it is speaking with another PCI compliant component (such as another bridge), it will not be customarily programmed to retransmit data as a result of mistransmission between the OPE 64 and IPE 78/FIFO 76. Thus, the FIFO 65 in the present invention retains all messages sent to OPE 64 until it receives an acknowledgment that transmission to the FIFO 76 was successful. That is, FIFO 65 will receive either an ACK, an NACK, or will time out each time it sends a command to OPE 64. The ACK and NACK functions will be described in greater detail later with respect to FIG. 16.

Referring to FIG. 8, the path of the communications will be as follows beginning with FIFO 65. FIFO 65 provides the command to OPE 64 and then retains the command in memory for the moment. OPE 64 packetizes and formats the data, sends it onto twisted pairs 63, from which it is received by IPE 78. If IPE 78 successfully receives the packet, it communicates it to FIFO 76, which will accept it if the FIFO 76 is not full. If the transmission is successfully made to FIFO 76, IPE 78 will communicate an acknowledgment to OPE 77. Note that IPE 78 does not acknowledge to the OPE 64 because communications are unidirectional between bridges 24 and 25 and proceed in a counterclockwise fashion relative to FIG. 8. Thus, IPE 78 communicates its acknowledgment to OPE 77, which communicates the acknowledgment over twisted pairs 63 to IPE 62. Upon receiving the acknowledgment from OPE 77, IPE 62 issues an FIFO clear function to FIFO 65, allowing the FIFO 65 to clear its buffer of the data provided to OPE 64.

On the other hand, if the IPE 78 encounters a full FIFO 76, it issues a NACK command to OPE 77, which communicates the NACK over twisted pairs 63 to IPE 62. IPE 62 then communicates the NACK to FIFO 65 and/or OPE 64 whereupon OPE 64 collects the data back from FIFO 65 and re-sends it over twisted pairs 63 to IPE 78.

It should be noted that OPE 64 provides packet sequence numbers to all packets provided to IPE 78. Since all packets must be received in order, IPE 78 recognizes missing packets when a sequence number is missed. In such a case, IPE 78 could communicate the NACK command to OPE 77. OPE 77 would then communicate that information to IPE 62, which communicates it to OPE 64. OPE 64 can then simply request and collect all information that has been queued by FIFO 65 for re-sending since the only packets that are not queued in FIFO 65 are those that have been acknowledged previously. In other words, when FIFO 65 sends packet sequence number 3, 4, 5, 6, and 7 to OPE 64 and IPE 78 successfully receives packets 3 and 4, it communicates acknowledgments for 3 and 4 to OPE 77 which communicates those acknowledgments through IPE 62 back to FIFO 65. Upon receiving acknowledgments for the packet sequences 3 and 4, FIFO 65 clears its buffers of the packet information for packets 3 and 4. Suppose then on the packet sequence 5, IPE 78 encounters a full FIFO 76. IPE 78 then communicates the NACK to OPE 77, which communicates it to IPE 62 and thereupon to OPE 64. The NACK command could, but need not, contain the sequence number for the problem packet since the OPE 64 and FIFO 65 know that the last packet successfully completed (and acknowledged) was packet number 4. Thus, FIFO 65 will re-send packets 5, 6, and 7 to OPE 64 and IPE 78 in response to the NACK request.

Preferably, IPE 78 issues NACKs on a very limited basis in order to maintain stability in the system and to avoid getting the system into a loop. Thus, in the preferred embodiment of the present invention, IPE 78 issues NACKs to OPE 77 only when a valid packet is received but cannot be filled into FIFO 76 because there is no room in FIFO 76 or the packets arrive out-of-order. Bad packets to IPE 78 are not NACK'ed by IPE 78, but instead are resent by FIFO 65 when a time out condition occurs between the time FIFO 65 sends a packet and a failure of FIFO 65 to receive an acknowledgment for that packet. Alternative arrangements can be envisioned for NACK production, but providing NACKs only for the full FIFO 76 or out-of-order conditions is preferred.

One can see from reviewing FIG. 8 that FIFO 75 operates similarly to that described above with respect to FIFO 65, except in the reverse direction (i.e., from bridge 25 to bridge 24). Similarly, FIFO 61 operates similarly to FIFO 76. In essence, communications between buses 20 and 21 occurs as follows: for communications from bus 20 to bus 21, bus 20 communicates with bridge 24 via PCI protocols, bridge 24 communicates with T chip 66 via PCI protocols, T chip 66 loads the data into FIFO 65, FIFO 65 provides the data to OPE 64, and OPE 64 puts the data onto twisted pairs 63. IPE 78 then takes the data from twisted pairs 63, provides it to FIFO 76, which provides it to M chip 74, which communicates it via PCI standard communication to bridge 25. Bridge 25 provides communication to bus 21. On the reverse path, communications occur from bus 21 to bridge 25, to target chip 73, to FIFO 75, to OPE 77, to twisted pairs 63, to IPE 62, to FIFO 61, to master chip 60, to bridge 24, and to bus 20.

Figure 9:
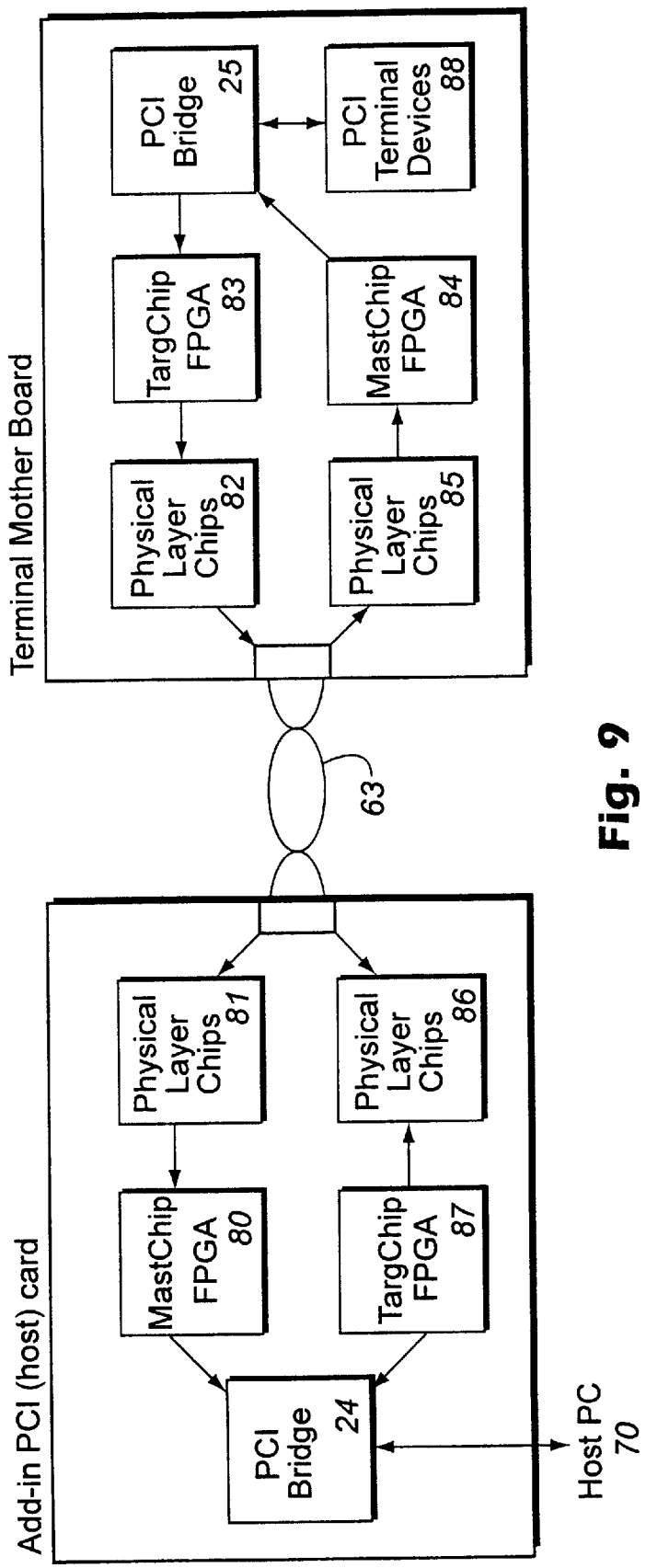
FIG. 9 is an alternative embodiment of the host and terminal bus connection circuitry.

One can see from the above description and Figures that FIG. 8 can be extended into the application of FIG. 6 to provide a long distance communication protocol for the split computer paradigm. The application of FIG. 8 into the split computer paradigm is illustrated in more detail in FIG. 9. In FIG. 9, the system consists of two boards, namely a PCI add-in card at the host computer site 186 and a terminal motherboard at the remote terminal site 188. The add-in PCI card plugs into one of a host computer's PCI slots and connects to the terminal with a length of category 5 twisted pairs cable 63. As shown in FIG. 9, the PCI host card and the terminal motherboard have the same basic hardware, but the terminal motherboard also includes various terminal devices 88 on its PCI bus. Namely, at the host site, a host PC communicates with a PCI bridge 24. The PCI bridge 24 communicates with a target chip 87, which communicates with physical layer chips 86 to provide packets onto twisted pairs 63. On the terminal side, physical layer chips 85 receive packets from twisted pairs 63, communicate them to master chip 84, which communicates them to PCI bridge 25. On the return path, PCI bridge 25 communicates PCI data to target chip 83, which communicates the information to physical layer chips 82, which communicates them in packet form onto twisted pairs 63. Physical layer chips 81 on the host side retrieve the packets from twisted pairs 63, communicate them to master chip 80, which communicate them to PCI bridge 24. A physical layout of the embodiment shown in FIG. 9 is also shown in FIG. 23.

Figure 22:
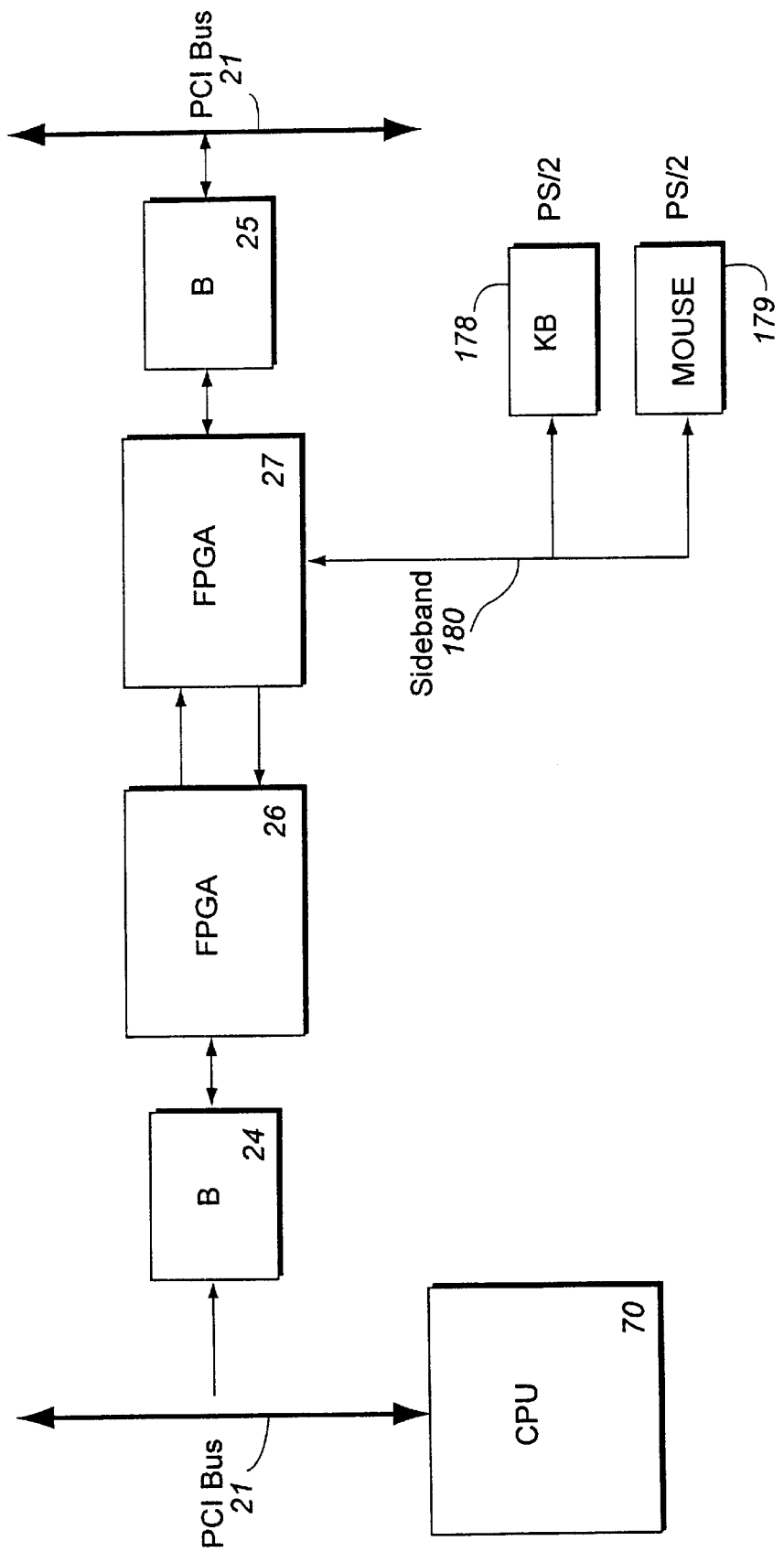
FIGS. 22 and 23 are example embodiments of the present invention illustrating the use of side band channels for PS/2 peripherals.
Figure 23:
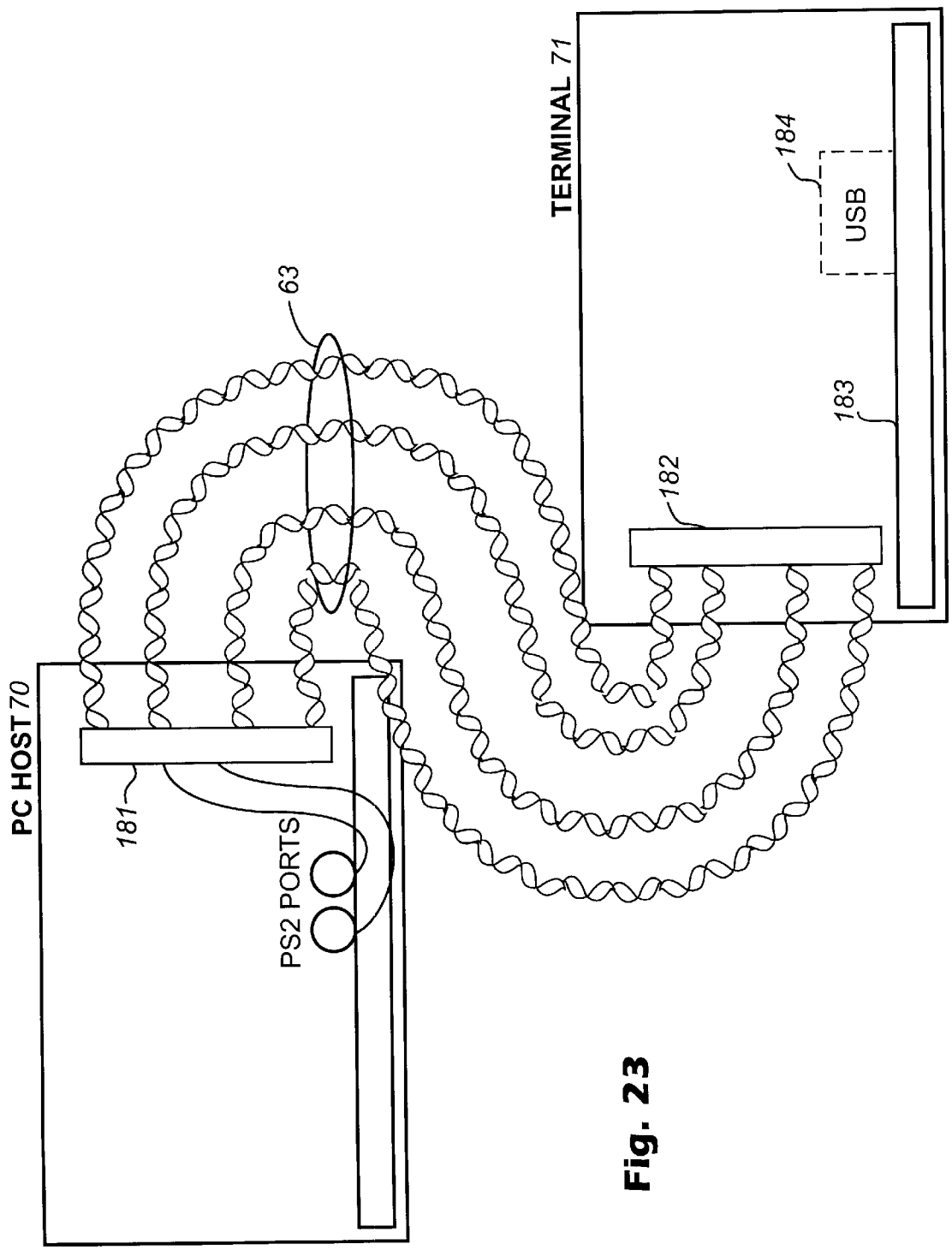

In FIG. 23, the host side 70 includes a PC with an add-in PCI card 181. The PCI card includes the components shown on the host side of FIG. 9. In addition, the PCI card 181 is jumpered to PS/2 ports in order to provide sideband signaling in accordance with the embodiment of FIG. 22, which will be described in more detail following. PCI add-in card 181 is connected via twisted pairs 63 to terminal 71 at the terminal 71 motherboard 183. Terminal 71 may also include add-in PCI cards 182 associated with various addon PCI devices. Terminal 71 also includes USB port 184 to which keyboard, mouse, and other similar types of devices are connected.

Figure 10:
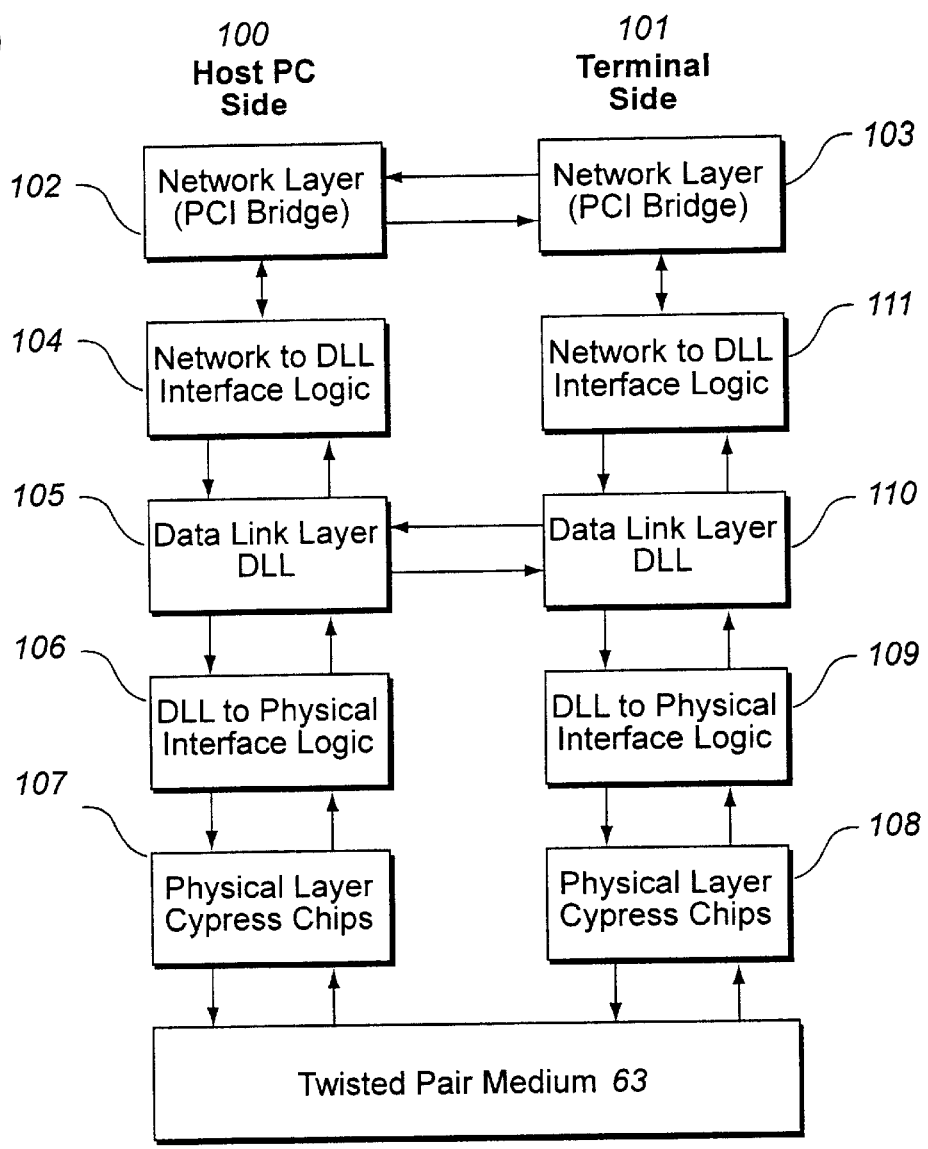
FIG. 10 is a networking protocol hierarchy associated with an example embodiment of the present invention.

The network protocol in accordance with the present embodiment is described with respect to FIG. 10. In FIG. 10, the network devices are described in terms of layers, with each layer performing an operation on a chunk of data and then passing the product up or down to the next layer. In FIG. 10, the top layer accepts PCI transactions from the host PC 70 or terminal device 71 and the bottom layer communicates over the twisted pairs 63. In other words, in accordance with FIG. 10, data is said to flow into the top side of one stack, down to the bottom of that stack, across the twisted pair cable, up the other stack and out the top of the other stack.

As shown in FIG. 10, on the PCI transaction side, host PC side 100 includes network layer 102, network-to-DLL interface layer 104, data link layer 105, DLL-to-physical interface 106, physical layer 107, and twisted pairs 63. On the terminal side 101, network layer 103 communicates with network-to-DLL interface layer 111, which communicates with data link layer 110, which communicates with DLL-to-physical interface layer 109, which communicates with physical layer 108, which communicates with twisted pairs 63. One will note that the layers in stacks 100 and 101 are symmetric, and although data changes form as it ascends and descends a stack, it will be returned to a functionally equivalent form as it goes to the same level on the other stack. In other words, a given layer deals with the same "packet" regardless of which stack it is in. Since the lower layers remain transparent, this allows the present invention to assume that layers are "talking" over virtual communication paths. Thus, for example, network layer 102, while not directly connected physically to network layer 103, is communicating via a virtual channel to it. The same is true of data link layers 105 and 110.

Since network layer 102 and network layer 103 correspond with, for example, bridge 24 and bridge 25 of FIG. 8, the illustration of FIG. 10 indicates that bridge 24 and bridge 25 are essentially speaking directly with one another through a virtual channel even though there are many components therebetween.

Similarly, the dotted line relationship between data link layer 105 on the host side 100 and data link layer 110 on the terminal side 101 indicates that the data link layer on the PCI add-in card on the host side 100 is, in essence, talking virtually to the DLL 110 on the terminal side, even though there are actually other layers in between.

The following is a discussion of the operation of each of the layers shown in FIG. 10. Beginning with the network layers 102/103, these layers can be embodied in a traditional PCI bridge, such as a bridge following the DEC 21152 PCI-to-PCI bridge specification. Definitions applicable to the network layer include:

Host Network Layer: the PCI bridge on the add-in card placed in the host PC.

Terminal Network Layer: the PCI bridge on the terminal main motherboard.

Initiating PCI Bridge: the PCI bridge that starts the transaction, which can be either the host or terminal network layer.

Target PCI Bridge: The PCI bridge that is recipient of a transaction started by an initiating PCI bridge.

Figure 11:
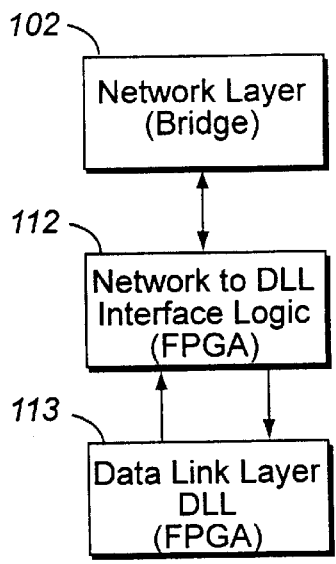
FIG. 11 is a network to DLL interface logic layering in accordance with an example embodiment of the present invention.

The network-to-DLL interface logic layers 104/111 are located within the FPGAs 26 and 27. The network to DLL logic layers 104/111 transform PCI transactions into actions that can be processed by the data link layer. These actions are then matched up and re-ordered if necessary to complete the transactions on the other side. An example embodiment of this interface is shown in FIG. 11. There, the bridge 102 is shown communicating with the network-to-DLL interface logic layer 112 embodied as an FPGA (or portion thereof). Communication between the network layer 102 and network-to-DLL logic layer 112 is bidirectional. That is, there is full duplex communication with the DLL 113, as shown in FIG. 11, but only multiplexed communication with the network layer 102. It is important to note that the network to DLL interface logic layer and underline layers are completely transparent. They have no PCI configuration registers, nor do they have access to those of higher layers.

Figure 12:
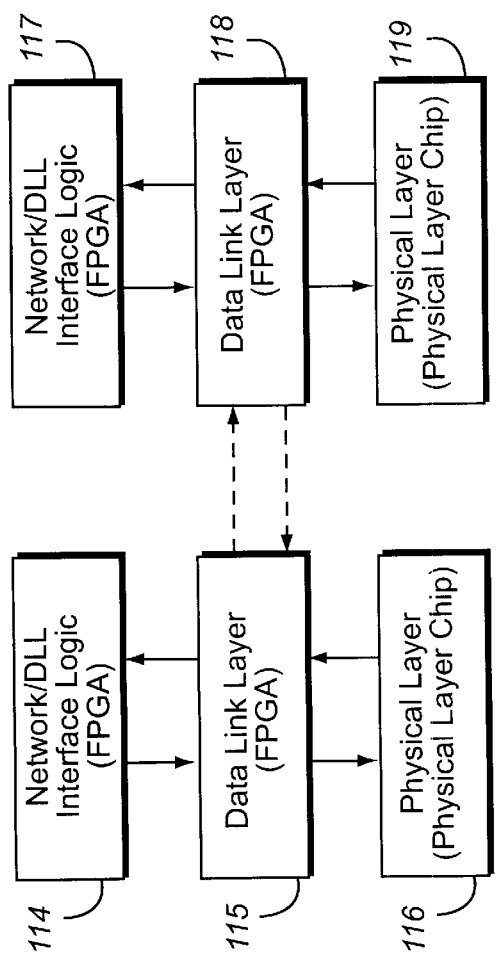
FIG. 12 is a data link layer representation in accordance with an example embodiment of the present invention.

The data link layers 105/110 act like a wrapper for the physical interface logic layer 106/109. In essence, they provide error-free communication and ensure that all packets arrive in order. Additionally, the DLL does some prioritization of packets (PCI versus non-PCI, for example). An example DLL layer is shown in FIG. 12. There, network to DLL interface logic layers 114/117 of, respectively, the host side 100 and terminal side 101, are embodied in FPGAs. The data link layers 115 and 118 are also embodied in FPGAs and provide interfaces to the physical layers 116 and 119.

The DLL must deal with lost or damaged packets. If one assumes that the Bit Error Rate (BERR) of the physical layer and medium is very low and that garbled packets will be rare, the goal of the DLL is then to make the information rate high while still guaranteeing error recovery. Definitions applicable to the data link layer include:

Host DLL: the portion of the FPGAs implementing the DLL on the add-in card used in the host machine.

Terminal DLL: the portion of the FPGAs implementing the data link layer on the terminal main motherboard.

Initiating DLL: the DLL that starts a transaction by sending the request action, and can be either the host or terminal DLL.

Target DLL: the DLL that receives a transaction by receiving the request action.

DLL Channel: the virtual data path between corresponding host and terminal DLLs.

Sending DLL: the DLL that sends the data packet needing an acknowledgment.

Receiving DLL: the DLL that receives the data packet and is responsible for returning an ACK.

CRC: Cyclic Redundancy Check: In accordance with the preferred embodiment of the present invention, a 16 bit CRC is used with the following arbitrary polynomial: $X^{16}+X^{15}+X^2+1$.

Figure 15:
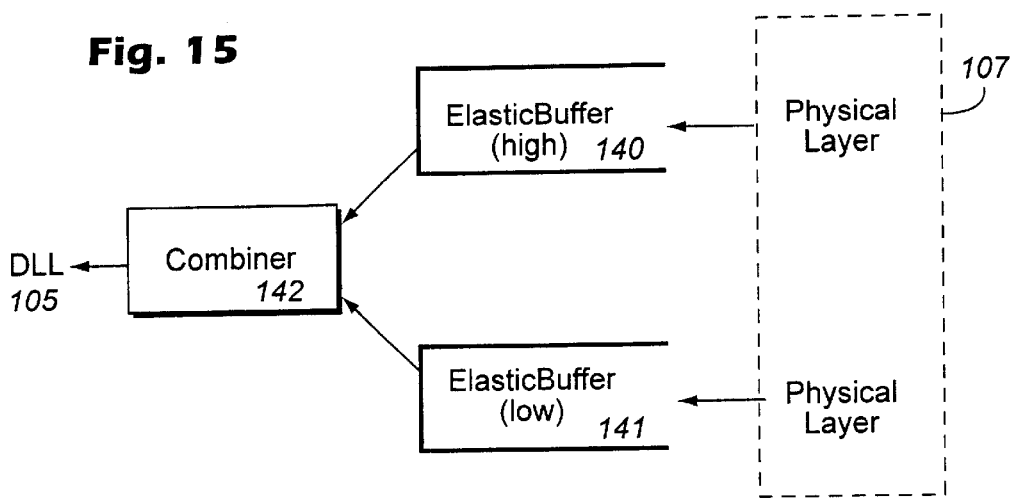
FIG. 15 is a block diagram of a DLL to physical layer interface in accordance with an example embodiment of the present invention.

The DLL-to-physical interface logic layers 106/109 consist of de-skewing circuitry, specifically elastic buffers and a combiner module. An example of such an interface is shown in FIG. 15 in which physical layer 107 is shown interconnected to DLL 105. Specifically, physical layers 107 are input to dual elastic buffers 140 and 141, the outputs of which are combined in combiner 142 and provided to DLL 105. The elastic buffers 140 and 141 are basically 16 entry deep FIFOs and some logic that compresses strings of idles down into a single idle in a string of stalls. Stalls are not stored in the FIFOs. The combiner 142 keeps the elastic buffers in synch by making sure the same type of data is being pulled from each. If the types stop matching (perhaps an idle cell in one and the data cell in the other), then the combiner stops accepting data until it can flush the elastic buffers and be sure that the two byte channels are back in synch. This takes a string of a least 16 idle cells. To be sure that the combiner 142 is always in synch after a re-scan, the key master (discussed in detail below) pads the data stream with 16 idles in the case of the re-scan.

The physical layers 107 and 108 will have different embodiments depending on the different types of physical transmission media desired. For the twisted pairs 63 indicated in the preferred embodiment, physical layer interface chips from Cypress Semiconductor or other suitable physical layer interface chips will suffice.

Figure 13:
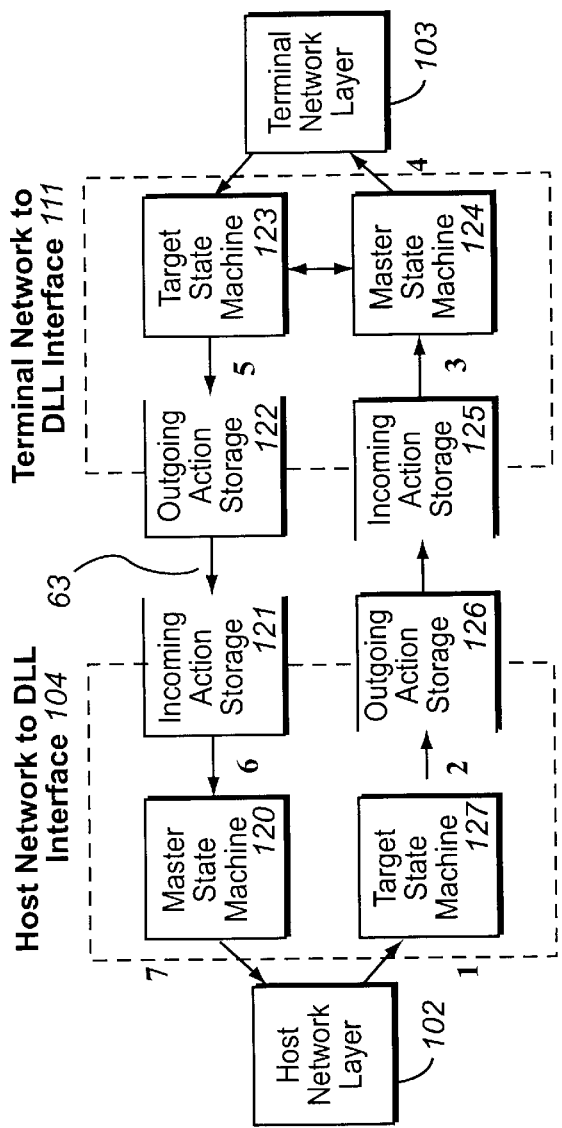
FIG. 13 is a flow diagram of data progressing between a host network layer and terminal network layer in accordance with an example embodiment of the present invention.

The network-to-DLL interfaces 104 and 111 are shown in more detail with respect to FIG. 13. The components that are involved in a communication in FIG. 13 vary depending on whether the communication is a one-action or two-action transaction. As described earlier, posted memory writes are considered completed by the initiator as soon as they are accepted, even if the data has not yet reached the target. Having completed a posted write (PW) transaction, the initiator can go on with other business and trust that any bridges between the initiator and the target will repeat and re-try the transaction as necessary until completion occurs down the line. A PW instruction from the host side to the terminal side in FIG. 13 will implicate host network layer 102, target state machine 127, outgoing action storage 126, incoming action storage 125, master state machine 124 and terminal network layer 103. In other words, communications 1, 2, 3, and 4 in FIG. 13 are involved in a one action transaction from the host side to the terminal side.

Non-posted commands (for example, reads, I/O writes, and configuration writes) are not considered completed by the initiator until after they have been accepted by the target. With very few exceptions, once an initiator attempts a non-posted command (NPC), it must continue to re-try it until it is accepted. If there are any bridges between the initiator and the target, they also adhere to the same rules. When they receive an NPC on one bus, they must defer the transaction with a re-try until they can get the NPC to complete on their other bus in what is known as a "delayed transaction." In the delayed transaction scenario from host to terminal of FIG. 13, all components 120–127 and all communication links 1–7 shown in FIG. 13 are implicated.

It should be noted that while the preferred embodiment is described with respect to PCI protocols, the present invention finds application outside of the PCI protocol environment. Thus, the one action and two-action transactions described herein are intended to reflect generic situations, not necessarily limited to the PCI or any other protocol.

In FIG. 13, during a two-action transaction, the request action provided from host network layer 102 (intended for terminal network 103, for example), is formed from data which is latched during a re-try. That way, there is no data transfer, and the transaction will not complete until a response action returns. A pending bit set in the network to the DLL interface logic 104/111 causes all NPCs to be retried. Further, no new NPC request action will be formed while the pending bit is set. Once the response is received, the network to DLL interface logic 104/111 waits for the NPC to be retried. Non-posted writes are then accepted or data previously read is returned.

As shown in FIG. 13, all PCI request and response actions are stored in incoming and outgoing action storage devices 121 and 126 on the host side and 122 and 125 on the terminal side. For each side, there are two main FIFOs, one for outgoing requests/responses (actions queued to be sent over the twisted pairs) and one for incoming requests/responses (actions received from the twisted pairs). As described above, these FIFOs are not traditional, but provide additional functionality not typically found in FIFOs, as discussed in detail above. As also shown in FIG. 13, there are two state machines 120 and 127 associated with the interface that play a primary role in the interface's operation. The target state machine acts as the target of a PCI transaction, initiated by a PCI bridge (for example, 102). The target state machine captures transaction data necessary to repeat the transaction on the other side. This information is encapsulated in a request action stored in the out FIFO 126. The master state machine takes request actions from the in FIFO 121 and (acting on behalf of the original master) attempts the request action to the target PCI bridge 102.

For read requests, there is a little overlapping responsibility between the target and master state machines. As with write requests, read requests are repeated by the master state machine. The target PCI bridge will then return data for the read request. For technical reasons, the returned data is formed into a response action by the target state machine. Likewise, when the response is received on the initiating side of the link, the transaction is still handled by the target state machine, but the data is provided by the master.

In other words, there is a division between data and control in the embodiment of FIG. 13. The target state machine 127 accepts transactions as if it were the target of all PCI transactions and the master state machine 120 repeats transactions as if it were the original master of that transaction. In FIG. 8, T chip 66 (the FPGA that contains the target state machine) sends data over the network and M chip 60 (the FPGA containing the master state machine) provides that data for transactions on the other side. A similar situation occurs as between target chip 73 and master chip 74 on the terminal side of 58.

Referring again to FIG. 13, a one action example embodiment is described, such as a PCI memory write transaction. First, a PCI memory write transaction is issued by the host network layer (initiating PCI bridge), for example 102. The associated target state machine 127 then stores a request action consisting of the address, command, byte enables, and data from the bridge 102 into the out FIFO 126. At this point, the PCI bridge and target state machine consider the transaction completed. The master state machine 124 receives the request action from the in FIFO 125 and transfers the write requests to the terminal network layer 103 (target PCI bridge). This completes the transaction on the terminal side.

Now, the two action example embodiment will be described with respect to FIG. 13. First, a non-posted PCI transaction (one that requires a two-action DLL transaction) is initiated by the host network layer 102 (initiating PCI bridge). The target state machine 127 stores a request action in the out FIFO 126 consisting of the address, command, byte enables, and data (for writes). The master state machine 124 receives the request from the in FIFO 125. The request is converted into a PCI transaction on the terminal network layer 103 (target PCI bridge) by the master state machine 124. In the case of a read, the target state machine 123 collects the data and places it in the terminal's out FIFO 122. The state machine receives the response action from the in FIFO 121. When the NPC is next retried by the host network layer 102 to target machine 127, the master state machine 120 then sends the return status (and any collected data) as a response action to host network layer 102. The transaction is completed by the data being provided by the master state machine to the host layer 102.

As shown in FIG. 11, the network to DLL interface layer 112 must share the multiplex channel connecting it to the network layer 102 (also known as the local PCI bus). The arbitration for this multiplex channel is done in the master chip FPGA 60 (FIG. 8). In the preferred embodiment, the arbitration is fair in that both masters (Mchip 60 and PCI bridge 24) are given the same priority for the channel therebetween. The arbiter essentially leaves the bus parked on the last agent to request the bus. PCI arbitration in the layer 112 is hidden in that the arbiter runs independently of the PCI bus and one agent can be granted the bus while it is being used by the other. If both agents require the bus, the arbiter will alternate the grants so that each master (Mchip 60 and bridge 24) can perform one transaction before relinquishing the bus. Other alternative arbitration methods are also envisioned in the present invention.

The PCI bridge specification requires PCI bridges to complete transactions according to certain rules, including:
1. System behavior is not affected by whether or not there are bridges between the PCI transactions master and target;
2. Starvation is minimized; and
3. Deadlock is prevented.

For the most part, these rules are handled by the PCI bridges 24 and 25 on the add-in PCI board and terminal motherboard (FIG. 9). There are, however, a few ordering rules that affect what the FPGAs 80, 87, 83, and 84 (FIG. 9) can and cannot do. Specifically:
1. Posted write transactions must complete on the target bus in the order in which they are accepted on the initiator bus;
2. NPC requests may not pass posted writes. In other words, if a posted write is accepted before an NPC, the posted write must complete on the target bus before the NPC can even be attempted;
3. NPC responses may not pass posted writes. All posted writes accepted before an NPC is completed must complete on their target bus before the response may be used; and
4. Posted write transactions must be given opportunities to pass NPC requests and responses.

To ensure that these rules are met, the following design considerations are incorporated into the preferred embodiment:
1. No actions in the out FIFO (65 in FIG. 8) are allowed to pass another action. Each action must be sent in the order they are queued, without reordering.
2. The DLL 115 must guarantee that all actions queued in the out FIFO 65 will be transmitted and queued in the in FIFO 76 in order. The DLL may not reorder transactions.
3. The in FIFO 76 will allow posted writes and NPC responses to pass NPC requests, but will not do any other reordering.

A careful review of the above design decisions indicates that rule #4 above is only partially enforced. Posted writes are allowed to pass NPC requests, but not NPC responses. Allowing posted writes to pass NPC requests prevents deadlock situations when a newer generation PCI compliant bridge is placed between two earlier generation PCI bridges.

It should be noted that some PCI data may be pre-fetched and some may not. Likewise, some data may be discarded while others may not. Specifically:
1. Under normal circumstances, write data may never be discarded. In the case of a target abort, the system can discard the remainder of the posted write.
2. PCI configuration reads, PC I/O reads, and PCI memory reads from non-pre-fetchable memory spaces may not be pre-fetched. PCI compliant bridges must read only the locations requested (with byte enables given) and no more.
3. Data read by PCI configuration reads, PCI configuration reads, PCI I/O reads and PCI memory reads from non-pre-fetchable memory spaces may never be discarded.
4. PCI memory reads from pre-fetchable memo spaces may be pre-fetched.
5. The first location fetched from any PCI memory read may not be discarded, but any pre-fetched data beyond that may be.

The system will discard pre-fetched data in two cases:
1. The master state machine may fetch more data than it will have room to queue in the out FIFO.
2. The initiator may end the transaction before consuming all the pre-fetched data.

In other words, if the target of a posted write disconnects the transaction, the master state machine must start another transaction from where the last posted write left off. It cannot "give up" until all the data has been accepted. However, if a PCI master ends a read transaction, orphaning some data, that data is discarded as long as at least one piece was used.

The PCI bridges in the preferred embodiment enforce the pre-fetching rules by disconnecting transactions in non-pre-fetchable space after the first data transfer.

One can see from the above pre-fetching and discarding rules that in essence, the system allows only one normal discarding situation in which a first bridge sends, for example, 7 bytes of data and the second bridge wants only 1 of the 7. In such a case, the latter 6 bytes can be discarded provided the second bridge accepts one word in the read operation. For writes, if a target indicates that it wishes only 50% of the write, then the system will start the transaction midpoint and resend until the target takes the entire packet a piece at a time.

The types and flow of data within the systems described above will now be described with respect to FIGS. 14 and 16 through 21.

FIG. 14 illustrates an example embodiment of a data link layer 105/110. In FIG. 14, physical layer interface 106A and 106B provide incoming and outgoing data from the transmission medium, such as the twisted pairs 63. Packets coming into the DLL are received by assembler 131, which communicates with in FIFO 130. In FIFO 130 buffers packets to master state machine 120 (see also FIG. 13). Intelligence for the input side is provided by director 132, which provides a liaison to the output side and provides interrupts, general purpose I/Os and sideband signals. The assembler and director can in one embodiment, make up the IPE 62. Director 132 communicates with the Keymaster 135 on the output side of FIG. 14. The Keymaster 135 acts as the intelligence for the output side. Outgoing packets are received by out FIFO 136 from target state machine 127 and are provided to the OPE 137 for ultimate provision to the physical interface layer 106B. Incoming interrupts, GP I/Os, and Serrs are provided to gate keeper 133, which prioritizes messages and delivers them to Outstanding Queue 134, which communicates with Keymaster 135. The Outstanding Queue 134 is another FIFO that maintains an index to packets in the out FIFO 136 that have not yet been acknowledged.

As an example of the operation of FIG. 14, consider a packet that arrives at assembler 131 (IPE) from physical interface layer 106A. Assembler 131 attempts to deliver the packet to in FIFO 130, but in FIFO 130 is full and thus cannot receive the packet. Assembler 131 then informs director 132 that in FIFO 130 is full. Director 132 communicates the fill condition to Keymaster 135, which tells the OPE 137 to generate a NACK signal to be put onto the physical interface layer 106B. FIG. 14 is repeated in mirror image on the terminal side such that OPE 137 is communicating the NACK to an assembler corresponding to assembler 131, on the terminal side. That assembler communicates the received NACK signal to the terminal-side director (corresponding to 132), which communicates it to the terminal-side Keymaster (corresponding to 135), which coordinates the retransmission of all outstanding queue (corresponding to 134) packets through the terminal-side OPE (corresponding to 137) to the host-side assembler 131.

Further operations of the data link layer will be described with respect to the packets and control of packets. Essentially, two types of packets proceed through the data link layer, data packets and acknowledgment packets. Data packets are either request actions or response actions and acknowledgment packets are either positive (ACK) or negative (NACK). Both types of packets end with a CRC transmission for error testing and any packet that fails CRC validation is ignored. No NACKs be sent in response to a failed CRC.

All transmitted data packets are kept in local memory until they are ACK-ed, in case retransmission is necessary, as described earlier. The two things that can precipitate a retransmission are the receipt of a NACK or a time out occurrence while waiting for an ACK. The time out period is arbitrary, but can be set at, for example, 255 clock cycles. Time outs should be repetitive that so packets will be retransmitted every 255 clocks until ACK-ed.

All data packets have a sequence number associated with them. Packets will only be accepted in the order of their sequence numbers. Acknowledgment packets are handled separately from data packets and are given a higher priority than data packets. A one action transaction includes one request and one acknowledgment while a two action transaction includes one request action within an acknowledgment and one response action with an acknowledgment.

The system pipelines packets (without any idle tokens therebetween) to maximize bandwidth. Likewise, ACKs can be combined to acknowledge a series of packets. For example, since all packets will only be accepted when they are received in order, an acknowledgment that packet number 7 in a sequence has been received implies that all packets prior to packet number 7 have also been received. Thus, if packets 4-5-6-7 are received in a burst, acknowledging packet 7 will acknowledge that all of the packets 4–7 were received.

If a packet in the middle of a pipeline stream is damaged in transmission, it and all packets that follow it will have to be retransmitted. Although a different method is certainly envisioned within the scope of the present invention, in the preferred embodiment, the receiving DLL will not store packets out of order. Thus, the DLL is never allowed to give up on transmitting a packet nor is a receiving DLL allowed to give up on a transmitted packet. Each packet will be retransmitted until it is ACKed or the system is reset.

If the receiving DLL receives a packet correctly and transmits an ACK, but the ACK is corrupted by noise, the sending DLL will eventually re-transmit the original data packet. The retransmitted data packet then arrives at the receiving DLL out-of-order because the receiving DLL was expecting the next packet sequence number (believing that it already acknowledged the retransmitted packet). This situation is referred to as being "behind" because the incoming sequence number is behind the one expected. In this case, the receiving DLL will discard the packet (since it has already dealt with it in the original transmission) and will repeat the original ACK to the sending DLL.

The opposite of that situation is the situation where the packets get "ahead." In that case, several packets have been pipelined, but one in the middle gets corrupted. The corrupted packet is ignored but the packet that follows it has a valid CRC. The following data packet is out-of-order because the receiving DLL has not yet processed the corrupted packet. In this case, the receiving DLL can transmit a NACK to trigger a retransmission of the missing packet and will thus save the delay time associated with waiting for a time out.

Ahead and behind conditions are determined by comparing incoming sequence numbers against an expected sequence number counter. Thus, there is no need for the sequence numbers on each side of the network to be kept in synch, but can be entirely independent of each other.

The ACKs and NACKs are high priority messages, with ACK having the highest priority and NACK having the second highest priority of all packets. Acknowledgment packets are injected between packets on the transmit side as soon as possible and are dealt with on the receive side as soon as their CRCs are verified. A sequence number is sent with an ACK to indicate which packet is being acknowledged. This number is actually taken from the sequence number counter and not from the received packet. This allows the DLL to acknowledge multiple packets at once. It also eliminates the concern of an ACK sequence number that is "behind."

NACKs, unlike ACKs, are not actually a necessary element. If any packet (data or ACK) is corrupted, the retransmit timer will eventually cause all queued packets to be retransmitted. The NACK provision simply makes the system faster by causing the retransmission to happen earlier than the time out occurrence would otherwise allow. NACKs, however, can lead to instability. For this reason, the rules associated with NACKs discussed previously cause their use to be limited to narrow occurrences. For example, the protocol of the preferred embodiment will never send two NACKs in a row for any reason, in order to avoid loops. Instead, if a second NACK is otherwise conditioned, the protocol will allow the time out condition to occur instead of sending the second NACK. To accomplish this, if a DLL sends a NACK, it will disable the NACK circuitry until a valid packet is received in order, whereupon it will again re-enable the NACK circuitry.

ACK and NACK generation are described with respect to FIG. 16. There, a packet is received at step 150 and is tested at step 151 to determine whether its CRC passes. If the CRC passes, the packet is uncorrupted and the sequence number of the packet is compared to the expected sequence number from the expected sequence number counter 152. If the numbers match, the in FIFO 130 will be analyzed to determine whether it can accept the new packet, at step 153. If the FIFO 130 is full, the system will look to send a NACK with respect to the received packet. First, at step 156, however, the system determines whether a NACK was previously sent at step 156. That is, once a NACK is sent, a packet must be successfully received before another NACK will be sent. Thus, in step 157, when a NACK is sent, the NACK circuitry is disabled, and, if the next packet would overflow the FIFO at 153 as well, the NACK circuitry will be disabled at step 156. If, on the other hand, this is a non-sequential occurrence of FIFO overflow at step 153, the NACKs will be enabled at step 155, a NACK will be sent at step 157, and then the NACK circuitry will be disabled for the next packet 150. If the FIFO is available to take the packet, however, the NACK circuitry is re-enabled at 155, the expected sequence counter is incremented at step 155 and an acknowledgment is sent at step 154. Note that, at step 152, if the sequence number comparison indicates that a behind condition exists, the acknowledgment will immediately be sent at step 154.

ACK packets are expected to arrive in order, but it is possible for ACKs to be in an ahead condition. If this occurs, the ACK that is received ahead acknowledges the reference packet and all packets before it. If a NACK packet is received, all unacknowledged packets are retransmitted in order. In addition, all unacknowledged packets are retransmitted in order when the retransmit timer times out. Re-transmissions begin by transmitting a group of idles to give the receiving logic a chance to reset.

The gatekeeper 133 (FIG. 14) is responsible for prioritizing packets, except for ACK and NACK packets, which are prioritized by the keymaster 135. The preferred prioritization by the gatekeeper 133 is: Serr (highest priority), Interrupts, General Purpose I/Os, and requests/responses (lowest priority). Prioritization given by the keymaster 135 is preferably: ACKs (highest priority), NACKs, and actions (lowest priority).

Figure 17:
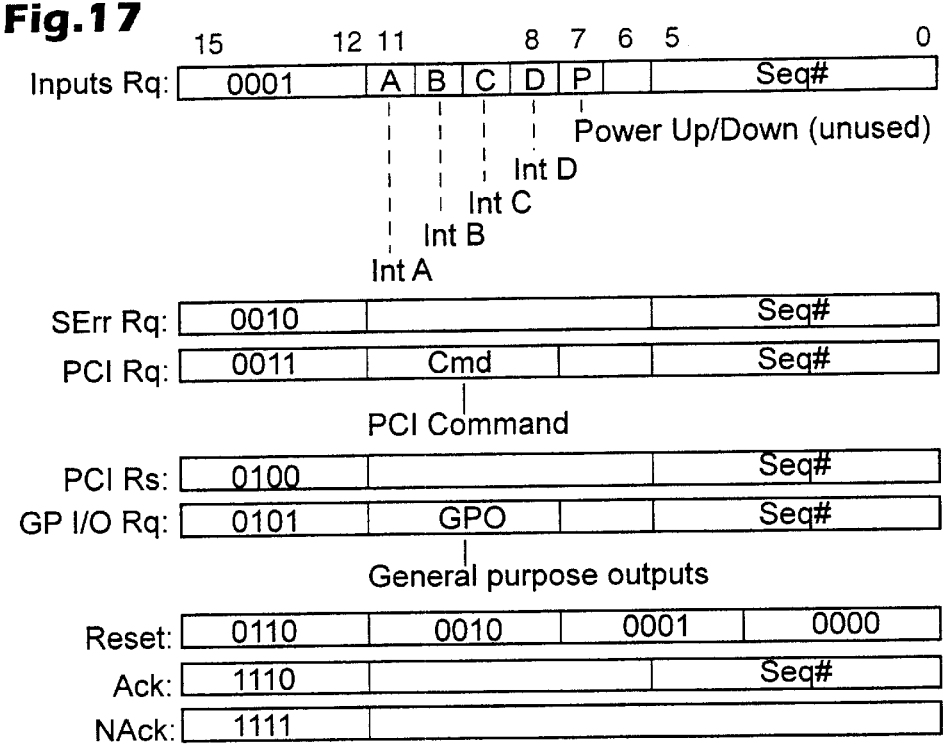
FIG. 17 are example header cells used in accordance with the present invention.
Figure 18:
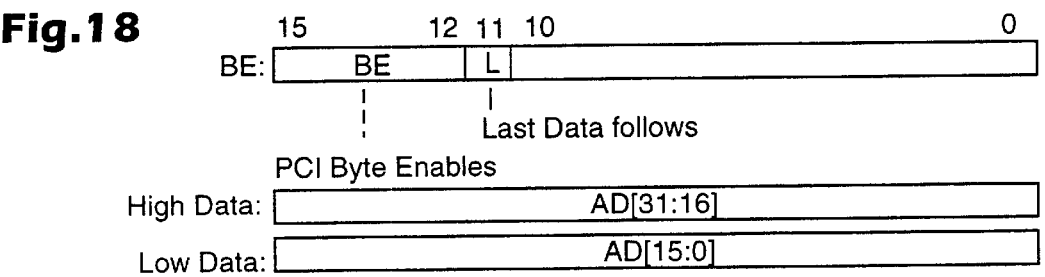
FIG. 18 is example data cells used in accordance with the present invention.
Figure 19:
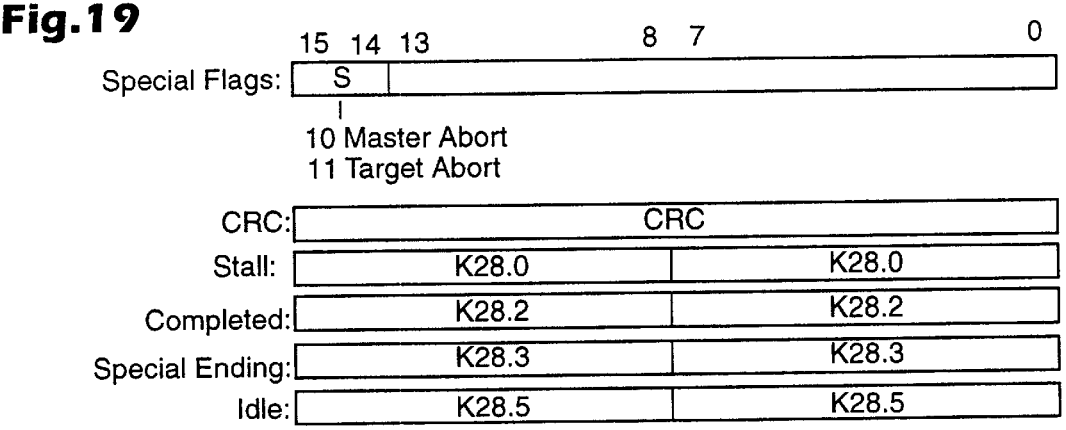
FIG. 19 are example miscellaneous cells also used in accordance with the present invention.

Although the present invention is not so limited, example data cells are shown in FIGS. 17–19. Packets may be of variable length, consisting of two or more cells. Each packet begins with a header cell and ends with a CRC cell. In the preferred embodiment, only requests and response packets have more cells than just the header cell and CRC cell. In FIGS. 17–19, unlabeled bits are reserved. It should be noted that the embodiments of FIGS. 17–19 are provided by way of example and the specifics of the cell formats is not critical to the present invention.

In FIG. 17, the header cells are shown. The Inputs Rq and Serr Rq headers are associated with sideband signals which will be described with respect to FIGS. 22–23. Next, PCI request (PCI Rq) and PCI response (PCI Rs), cells are shown. As shown, the PCI request cell will have a command associated with it. As described earlier, the PCI request cell is associated with one action and two action transactions and the PCI response cell is associated only with the two action transaction. The general purpose I/O request cell are sideband signals similar to ones used as described with respect to FIG. 22 to get commands to a terminal without going through the PCI interface at the terminal. Also shown in FIG. 17 are the reset, ACK and NACK cells. The reset cell happens on power up and resets all of the PCI devices, the sequence numbers, the registers and clears out the FIFOS. The ACK cell includes the sequence number of the packet being acknowledged. The NACK cell does not include a sequence number but instead precipitates a complete retransmission of all unacknowledged cells currently held in queue at the transmitter. The list of unacknowledged transmissions is maintained in Outstanding Queue 134.

Data cells are shown in FIG. 18, including the byte enable cell, high data and low data cells. The high data and low data cells are assembled in the assembler 131.

FIG. 19 illustrates certain other miscellaneous cells. The special flags cell can be set to one of two conditions, master abort or target abort. The master abort indicates that no PCI card was found in a PCI slot. A target abort indicates a massive failure. The CRC cell concludes each packet, as described previously. The stall cell is used to fill time while the sender is waiting to send additional data.

In the present embodiment, outgoing packets operate in a pass-through mode, not a store-and-forward mode. This means that the system cannot force the master to send data at any rate other than what the master wishes to send it at. Thus, if the master sends a burst of data and then waits for a period, the FIFO could run dry during the wait period. That the FIFO should not receive an idle within a packet 30 when a packet portion is delayed. The present invention provides stalls to fill the wait period.

In FIG. 19, the next cell, "Completed" indicates the last data in a response. The "Special Ending" cell indicates that a Special Flag cell will follow. Finally, the "idle" cell is sent between packets.

Figure 21:
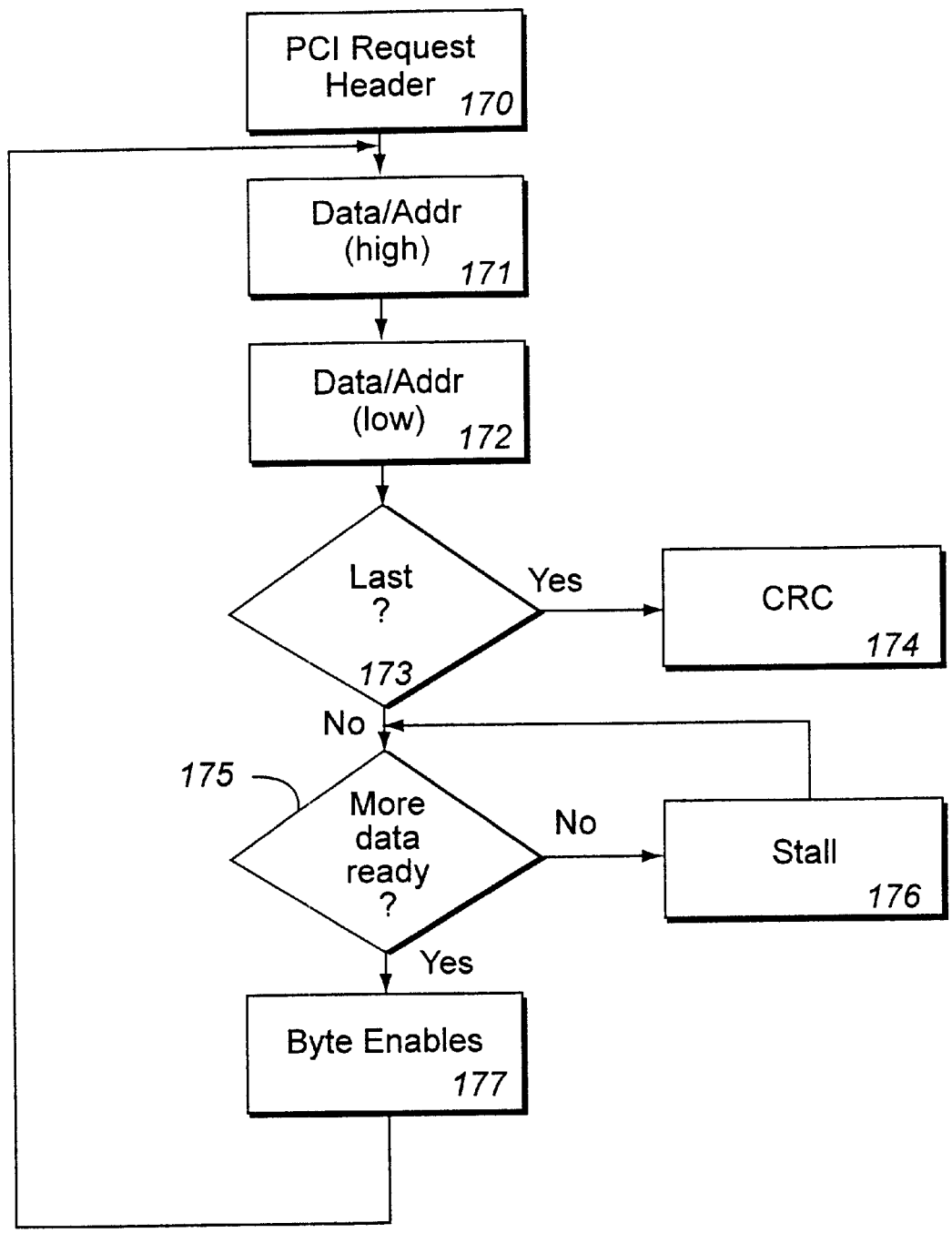

FIG. 21 illustrates a flow diagram of the assembly of PCI request packets. PCI requests, as shown in FIG. 17 are composed of a header cell, a PCI address (high data cell, low data cell), one or more data blocks, and then a CRC cell. Each data block includes one byte enable cell and a piece of PCI data (high data cell, low data cell). Even PCI requests that do not actually have data (such as reads) have one whole data block. At step 170, the PCI request header is composed and at steps 171–172, the high and low data are added. If that is the last data block at step 173, the CRC is added at step 174. If not, at step 175 the master is checked to determine whether more data is ready. If not, the stall cell of FIG. 19 is added at step 176 until more data is ready. If so, the byte enable cell of FIG. 18 is added at step 177 and flow returns to adding the additional high and low data of the available data at step 171–172.

Figure 20:
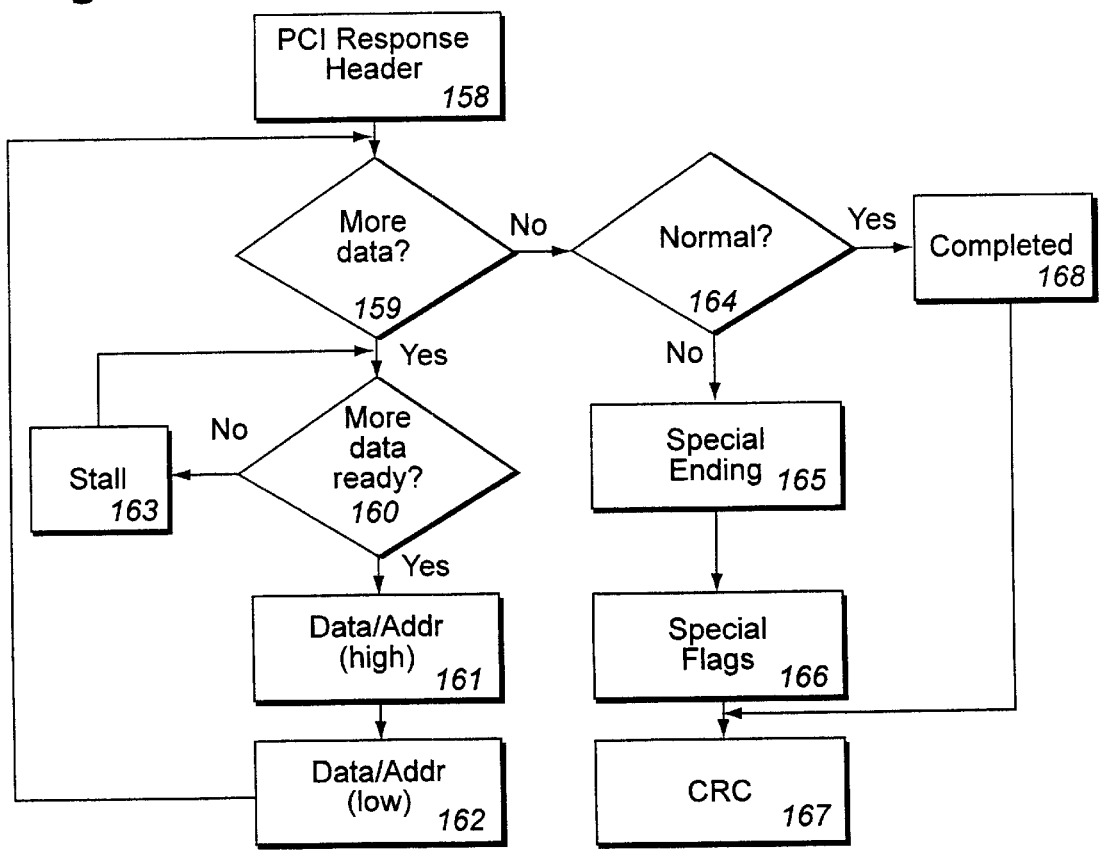
FIGS. 20 and 21 are flow diagrams illustrating an example method of assembling PCI responses and requests, respectively.

FIG. 20 illustrates the assembly of PCI response packets. PCI responses are composed of the header cell, zero or more pieces of PCI data (high data cell, low data cell), an ending block, and then a CRC cell. The ending block will be either a special ending cell followed by a special flag cell or a completed cell, of FIG. 19. In FIG. 20, the PCI response header is added at step 158. If more data is coming at step 159 and is ready at step 160, it is added at steps 161 and 162. Flow then returns back to an inquiry whether additional data is coming at step 159. If more data is coming at step 159 but is not yet ready at step 160, stall cells (FIG. 19) are added at step 163. If no additional data is coming at step 159, and the data is non-special at step 164, the completed cell is returned at step 168 and then the CRC cell is added at step 167. On the other hand, if the ending is special, the special ending is added at step 165 based on the special ending cell of FIG. 19 and then the special flags are added at step 166 based on the special flag cell of FIG. 19. After the special flags cell is added at step 166, the CRC cell is added at step 167.

Supplementing FIGS. 20 and 21, all other kinds of packets not described in FIGS. 20 and 21 are assembled simply by assembling a header cell with a CRC into a two word packet.

Since the physical layer interface accepts and transmits a stream of cells without any regard to meaning or structure, it is up to the DLL to create and recognize frame boundaries. The DLL decodes packets as they are received. All packet types are detectable by decoding the header cell. Rules for framing are as follows:

1. Two word packets are framed by their length;
2. PCI request packets are framed by looking for L=1 in a byte enable cell; and
3. PCI responses are framed by the special cells, completed in special ending.

Corrupted data could cause the frame logic to get confused. If the combiner 142 (FIG. 15) of the assembler 131 determines it has lost synch, it will stop accepting data until it can flush the elastic buffers 140–141 and be sure that the two byte channels are back in synch. This is usually done with a string of 16 idle cells. To be sure that the combiner 142 is always in synch after a re-scan, the key master 135 pads the data stream with 16 idle (FIG. 19) in the case of a re-scan. In accordance with the preferred protocol, idles do not appear within a packet since receiving an idle will reset the packet assembler 131.

In accordance with the preferred protocol, packets are sent using cut-through switching, as opposed to store-and-forward. Alternative protocols are also envisioned within the present invention, including the store-and-forward method in which the state machine does not begin transmitting a packet until the entire packet has been received. In the preferred protocol, packets begin transmitting as soon as possible in accordance with cut-through switching. Although cut-through switching is more complicated, it is more efficient than store-and-forward since there is less latency between receipt and transmission. In other words, it is possible for the OPE 137 to run the out FIFO dry by underflow. If this happens, the OPE 137 will insert the stall cells (FIG. 19), which will then be stripped out in the elastic buffers 140 and 141 when the stalls are received.

Referring now to FIG. 22, the description of the transmission of keyboard and mouse signals from the terminal side of the present invention to the host side of the present invention will now be described in accordance with the preferred embodiment. Keyboards and mice sometimes follow the so-called PS/2 standard for data transmission. Unfortunately, the PS/2 transmission does not use PCI messaging and thus cannot go onto the PCI bus 21 in the PS/2 format. One could use a USB card in the PCI slot and then hang the keyboard and mouse 178 and 179 off of the USB card in order to get the keyboard and mouse PS/2 signals onto the PCI bus 21. Alternatively, in accordance with the preferred embodiment, the keyboard and mouse 178 and 179 bypass the PCI bus 21 using sideband signals 180. "Sideband" signals refer to signals that bypass the PCI bus and go directly into FPGA 27. It should be noted that any peripherals that do not follow the PCI standard (or other alternative data bus standard for bus 21) can be maintained in the split computer paradigm using this sideband signal approach shown in FIG. 22. In the embodiment of FIG. 22, keyboard and mouse signals from keyboard and mouse 178 and 179 are provided by sideband 180 to FPGA 27, where they are transmitted outside the main data flow to the FPGA 26. The FPGA 26 then provides them to CPU 70 via sidebands such that CPU 70 receives the keyboard and mouse signals directly from FPGA 26.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A remote-distance communications interface between a processor and physically disassociated peripheral controllers, comprising:

a first data bus onto which the processor communicates;

a second data bus, physically disassociated from the first data bus, onto which the disassociated peripheral controllers communicate; and a bus interface coupling the first and second data buses to organize communication between said processor and said disassociated peripheral controllers and including at least one clock domain barrier between said first and second data buses.

2. An interface according to claim 1, wherein the bus interface includes a host interface coupled to the first data bus and a terminal interface coupled to the second data bus, and wherein said host interface and said terminal interface communicate via a common communication medium.

3. An interface according to claim 2, wherein:

the host interface further includes a first bridge coupled to the first data bus, and the terminal interface further includes a second bridge coupled to the second data bus.

4. An interface according to claim 2, wherein:

the host interface includes at least one state machine and at least one temporary storage device, and the terminal interface includes at least one other state machine and at least one other temporary storage device.

5. An interface according to claim 4, wherein:

the host interface includes:

a host master state machine and a host incoming temporary storage device together providing a unidirectional path from the communication medium to the first bridge, and a host target state machine and a host outgoing temporary storage device together providing a unidirectional path from the first bridge to the communication medium; and the terminal interface includes:

a terminal master state machine and a terminal incoming temporary storage device together providing a unidirectional path from the communication medium to the second bridge, and a terminal target state machine and a terminal outgoing temporary storage device together providing a uni-directional path from the second bridge to the communication medium.

6. An interface according to claim 5, wherein the host incoming temporary storage device receives data packets from the terminal outgoing temporary storage device.

7. An interface according to claim 6, wherein the terminal incoming temporary storage device receives data packets from the host outgoing temporary storage device.

8. An interface according to claim 7, wherein terminal and host outgoing temporary storage devices retain a certain data packet after sending the certain data packet to, respectively, the host and terminal incoming temporary storage devices and clear said certain data packet only after said respective host and terminal incoming temporary storage devices return acknowledgments corresponding to said certain data packet.

9. An interface according to claim 3, wherein the host interface further includes a first FPGA coupled between the first bridge and the communication medium and the terminal interface further includes a second FPGA coupled between the second bridge and the communication medium.

10. An interface according to claim 9, wherein the first and second FPGAs further respectively include first and second FIFOs.

11. An interface according to claim 9, wherein the first and second FPGAs further respectively include first and second pairs of FPGAs.

12. An interface according to claim 3, wherein the host interface further includes a first ASIC coupled between the first bridge and the communication medium and the terminal interface further includes a second ASIC coupled between the second bridge and the communication medium.

13. An interface according to claim 12, wherein the first and second ASICs further respectively include first and second FIFOs.

14. An interface according to claim 12, wherein the first and second ASICs further respectively include first and second pairs of ASICs.

15. An interface according to claim 10, wherein the first and second pairs of FIFOs include buffers to store data already output onto the communication medium until receipt of said data is acknowledged.

16. An interface according to claim 10, wherein the first and second pairs of FIFOs include buffers to store data already output onto the communication medium and to repeat the stored data output when an acknowledgment is not received after a predetermined time.

17. An interface according to claim 5, wherein the host and terminal interfaces provide cut-through switching from the host and terminal outgoing storage devices.

18. An interface according to claim 17, wherein the host and terminal interfaces provide store-and-forward switching from the host and terminal incoming storage devices.

19. An interface according to claim 3, wherein the host interface further includes:

a host master state machine coupled to output to the first bridge;

a first FIFO outputting master bus data to the host master state machine;

a host incoming packet processor coupled to the communication medium to receive packets from the communication medium, format convert the packets and output the format converted packets to the first FIFO;

a host target state machine coupled to input target bus data from the first bridge;

a second FIFO receiving the target bus data from the host target state machine; and a host outgoing packet processor coupled to the communication medium to format the target bus data from the second FIFO into packets and deliver the packets onto the communication medium; and wherein the terminal interface further includes:

a terminal master state machine coupled to output to the second bridge;

a third FIFO outputting master bus data to the terminal master state machine;

a terminal incoming packet processor coupled to the communication medium to receive packets from the communication medium, format convert the packets and output the format converted packets to the third FIFO;

a terminal target state machine coupled to input target bus data from the second bridge;

a fourth FIFO receiving the target bus data from the terminal target state machine; and a terminal outgoing packet processor coupled to the communication medium to format the target bus data from the fourth FIFO into packets and deliver the packets onto the communication medium.

20. An interface according to claim 1, wherein the bus interface further includes a second clock domain barrier between said first and second data buses.

21. An interface according to claim 1, wherein the bus interface includes:

an assembler to receive packets of data from a communication medium and de-packet said data;

an in-FIFO to receive the de-packeted data and buffer said de-packeted data for destination onto the first bus;

an out-FIFO to receive interactive data from the second bus and buffer the interactive data; and an outpacket engine to receive the interactive data from the out-FIFO, packet the interactive data into said packets of data received by the assembler and to output said packets of data to said assembler.

22. An interface according to claim 21, further including:

a director to control operation of the assembler; and a keymaster to control operation of the outpacket engine.

23. An interface according to claim 22, further including an outstanding queue circuit to index the interactive data delivered to the out-FIFO.

24. An interface according to claim 23, wherein the keymaster further issues an acknowledgment to the outpacket engine each time the in-FIFO buffers a corresponding one of said de-packeted data.

25. An interface according to claim 24, wherein the outpacket engine delivers said acknowledgment to the assembler, and said assembler thereby commands said outstanding queue circuit to remove said depacketed data corresponding to said acknowledgment from said index.

26. A computer system, comprising:

a processor;

an applications storage device operatively associated with the processor to provide the processor with applications routines;

local peripheral controllers operatively associated with user computer peripherals and interfacing said applications routines with said user computer peripherals;

a split data bus comprising:
- a first data bus onto which the processor and applications storage device communicate;
- a second data bus onto which the local peripheral controllers communicate; and
- a bus interface coupling the first and second data buses and including at least one clock domain barrier between said first and second data buses.

27. An interface according to claim 26, wherein the bus interface further includes a second clock domain barrier.

28. An interface according to claim 26, wherein the local peripherals include two from the group consisting of:
- a video controller;
- a sound card;
- a floppy drive; and
- a PCI-compliant peripheral controller.

29. An interface according to claim 26, further including at least one user device comprising at least one of a keyboard and a pointing device, said user device producing user device signals input directly to said bus interface and passing to said first data bus without passing through said second data bus.

* * * * *